(12) United States Patent
Okita et al.

(10) Patent No.: US 9,904,467 B2
(45) Date of Patent: Feb. 27, 2018

(54) DISPLAY DEVICE

(71) Applicants: Munechika Okita, Nisshin (JP); Hiroshi Nishimura, Anjou (JP)

(72) Inventors: Munechika Okita, Nisshin (JP); Hiroshi Nishimura, Anjou (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 537 days.

(21) Appl. No.: 14/391,297

(22) PCT Filed: Apr. 12, 2013

(86) PCT No.: PCT/JP2013/061129
§ 371 (c)(1),
(2) Date: Oct. 8, 2014

(87) PCT Pub. No.: WO2013/154194
PCT Pub. Date: Oct. 17, 2013

(65) Prior Publication Data
US 2015/0067574 A1 Mar. 5, 2015

(30) Foreign Application Priority Data
Apr. 13, 2012 (JP) .................................. 2012-092348

(51) Int. Cl.
*G06F 3/0488* (2013.01)
*B60K 37/06* (2006.01)
(Continued)

(52) U.S. Cl.
CPC .......... *G06F 3/04886* (2013.01); *B60K 35/00* (2013.01); *B60K 37/06* (2013.01);
(Continued)

(58) Field of Classification Search
CPC G06F 3/013; G06F 3/0485; B60K 2350/1028
See application file for complete search history.

(56) References Cited

U.S. PATENT DOCUMENTS

| 6,243,076 | B1 * | 6/2001 | Hatfield | .................. | G06F 3/013 |
| | | | | | 345/156 |
| 8,255,827 | B2 * | 8/2012 | Malik | ..................... | G06F 3/013 |
| | | | | | 715/788 |

(Continued)

FOREIGN PATENT DOCUMENTS

| CN | 102159419 A | 8/2011 |
| DE | 102008048825 A1 | 3/2010 |

(Continued)

*Primary Examiner* — William Bashore
*Assistant Examiner* — Nathan Shrewsbury
(74) *Attorney, Agent, or Firm* — Sughrue Mion, PLLC

(57) ABSTRACT

A display device 100 for displaying content on a display 12, integrated with a touch panel 23, includes position detection means 32 for detecting a position indicated on the display; and content layout determination means 33 for determining a layout of a plurality of contents displayed on the display wherein, when the position detection means detects that a predetermined position on the display is indicated or a display position of a predetermined content is indicated, the content layout determination means moves at least one of displayed contents, based on a priority of displayed contents predetermined according to the display contents displayed on the display, and displays a soft key at a position where a line of sight movement amount is smaller than a line of sight movement amount of the content.

8 Claims, 27 Drawing Sheets

(51) Int. Cl.
   *G06F 3/16*      (2006.01)
   *G06F 3/0484*    (2013.01)
   *G01C 21/36*     (2006.01)
   *B60K 35/00*     (2006.01)

(52) U.S. Cl.
   CPC ....... *G01C 21/3664* (2013.01); *G06F 3/0484* (2013.01); *G06F 3/0488* (2013.01); *G06F 3/04842* (2013.01); *G06F 3/16* (2013.01); *B60K 2350/104* (2013.01); *B60K 2350/1032* (2013.01)

(56) References Cited

U.S. PATENT DOCUMENTS

| | | | | |
|---|---|---|---|---|
| 8,564,549 | B2 * | 10/2013 | Kim | G03B 21/14 345/1.2 |
| 2003/0046401 | A1 * | 3/2003 | Abbott | G06F 9/4443 709/228 |
| 2005/0276448 | A1 * | 12/2005 | Pryor | B60K 35/00 382/103 |
| 2006/0103624 | A1 * | 5/2006 | Ishito | G03B 5/00 345/156 |
| 2007/0126698 | A1 * | 6/2007 | Iwamoto | G01C 21/3664 345/156 |
| 2007/0297064 | A1 * | 12/2007 | Watanabe | B60K 35/00 359/630 |
| 2008/0129684 | A1 * | 6/2008 | Adams | B60K 35/00 345/156 |
| 2009/0040196 | A1 * | 2/2009 | Duckstein | B60K 35/00 345/204 |
| 2009/0327977 | A1 * | 12/2009 | Bachfischer | B60K 35/00 715/863 |
| 2010/0079413 | A1 * | 4/2010 | Kawashima | B60K 35/00 345/175 |
| 2010/0268426 | A1 * | 10/2010 | Pathak | G06F 3/03547 701/48 |
| 2011/0130921 | A1 * | 6/2011 | Ono | B60K 35/00 701/36 |
| 2011/0234639 | A1 * | 9/2011 | Shimotani | G01C 21/3664 345/661 |
| 2011/0285657 | A1 | 11/2011 | Shimotani et al. | |
| 2012/0260164 | A1 * | 10/2012 | Scheufler | B60K 35/00 715/702 |
| 2013/0212487 | A1 * | 8/2013 | Cote | G06F 3/048 715/745 |
| 2013/0263280 | A1 * | 10/2013 | Cote | G06F 21/62 726/26 |
| 2014/0132499 | A1 * | 5/2014 | Schwesinger | A63F 13/06 345/156 |
| 2014/0331185 | A1 * | 11/2014 | Carls | B60K 37/06 715/835 |
| 2016/0089980 | A1 * | 3/2016 | Kurahashi | G06F 3/013 345/156 |

FOREIGN PATENT DOCUMENTS

| | | |
|---|---|---|
| DE | 102009059867 A1 | 6/2011 |
| JP | 2008-129689 A | 6/2008 |
| WO | 2008/070815 A1 | 6/2008 |
| WO | 2010031454 A1 | 3/2010 |

* cited by examiner

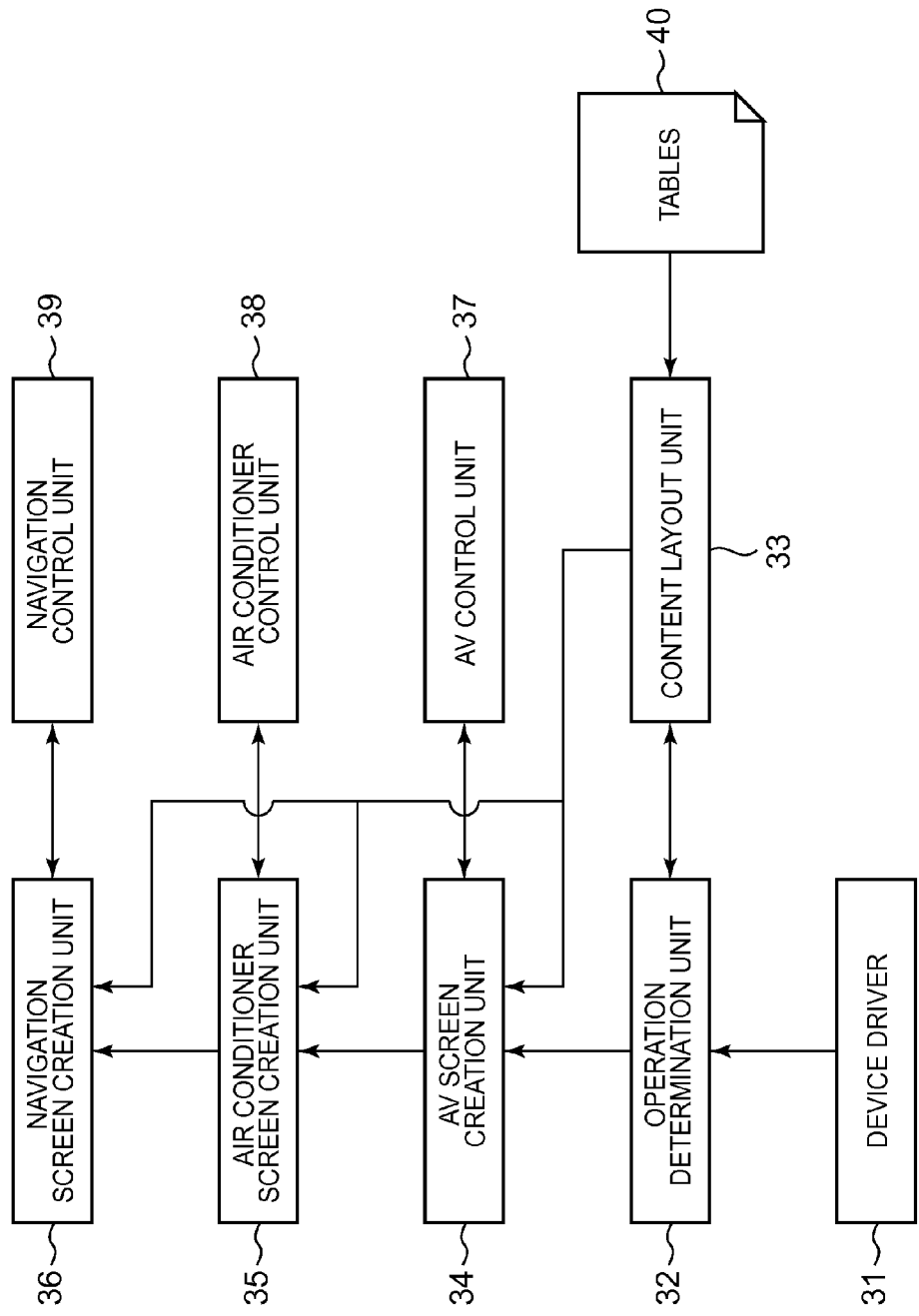

FIG. 5

| NORMAL LAYOUT | DISPLAY CONTENT | | |
|---|---|---|---|
| | NAVIGATION SCREEN<br>AIR CONDITIONER SCREEN 1<br>AIR CONDITIONER SCREEN 2 | AV SCREEN<br>AIR CONDITIONER SCREEN 1<br>AIR CONDITIONER SCREEN 2 | NAVIGATION SCREEN<br>AV SCREEN | AIR CONDITIONER SCREEN 1<br>AIR CONDITIONER SCREEN 2 |
| 1 | AIR CONDITIONER SCREEN 1 | AIR CONDITIONER SCREEN 1 | NAVIGATION SCREEN | AIR CONDITIONER SCREEN 1 |
| 2 | NAVIGATION SCREEN | AV SCREEN | AV SCREEN | AIR CONDITIONER SCREEN 2 |
| 3 | AIR CONDITIONER SCREEN 2 | AIR CONDITIONER SCREEN 2 | | |

FIG. 6

|  | HEIGHT |
|---|---|
| NAVIGATION SCREEN | A |
| AIR CONDITIONER SCREEN 1 | B |
| AIR CONDITIONER SCREEN 2 | C |
| AV SCREEN | D |

FIG. 8

|  | TOUCH DETERMINATION TARGET | LINK TARGET |
|---|---|---|
| LINK RELATION | AIR CONDITIONER SCREEN 1 | AIR CONDITIONER SCREEN 2 |
| LINK RELATION | AV SCREEN 1 | AV SCREEN 2 |

FIG. 10

| OPERATION LAYOUT | DISPLAY CONTENT | | |
|---|---|---|---|
| 1 | NAVIGATION SCREEN AIR CONDITIONER SCREEN 1 AIR CONDITIONER SCREEN 2 | AV SCREEN AIR CONDITIONER SCREEN 1 AIR CONDITIONER SCREEN 2 | NAVIGATION SCREEN AV SCREEN | AIR CONDITIONER SCREEN 1 AIR CONDITIONER SCREEN 2 |
| 2 | AIR CONDITIONER SCREEN 1 | AIR CONDITIONER SCREEN 1 | AV SCREEN | AIR CONDITIONER SCREEN 1 |
|  | AIR CONDITIONER SCREEN 2 | AIR CONDITIONER SCREEN 2 | NAVIGATION SCREEN | AIR CONDITIONER SCREEN 2 |
| 3 | NAVIGATION SCREEN | AV SCREEN | | |

FIG. 14
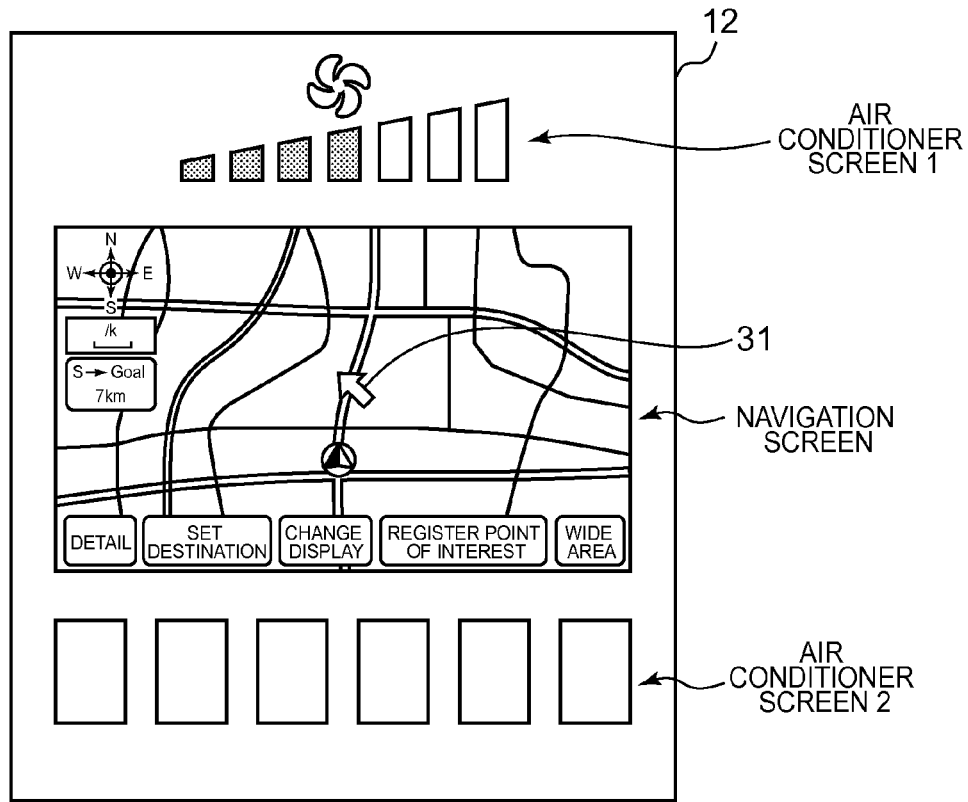
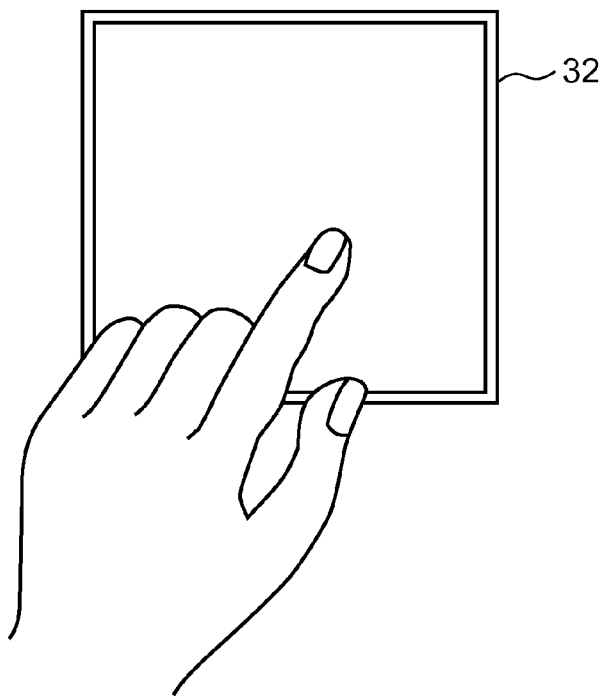

FIG. 18

| DISPLAY CONTENT | OPERATION LAYOUT 1 (AIR CONDITIONER SCREEN 1 IS OPERATED) | OPERATION LAYOUT 2 (AV SCREEN 1 IS OPERATED) | OPERATION LAYOUT 3 (NO CONTENT IS SPECIFIED) |
|---|---|---|---|
| NAVIGATION SCREEN<br>AIR CONDITIONER SCREEN 1<br>AIR CONDITIONER SCREEN 2<br>AV SCREEN 1<br>AV SCREEN 2 | 1 AIR CONDITIONER SCREEN 1<br>2 AIR CONDITIONER SCREEN 2<br>3 NAVIGATION SCREEN<br>4 AV SCREEN 1<br>5 AV SCREEN 2 | 1 AV SCREEN 1<br>2 AV SCREEN 2<br>3 NAVIGATION SCREEN<br>4 AIR CONDITIONER SCREEN 1<br>5 AIR CONDITIONER SCREEN 2 | 1 AIR CONDITIONER SCREEN 1<br>2 AIR CONDITIONER SCREEN 2<br>3 NAVIGATION SCREEN<br>4 AV SCREEN 1<br>5 AV SCREEN 2 |

FIG. 23

| DISPLAY CONTENT | OPERATION LAYOUT 1 (AIR CONDITIONER SCREEN 1 IS OPERATED) | OPERATION LAYOUT 2 (NAVIGATION SCREEN IS OPERATED) | OPERATION LAYOUT 3 (AV SCREEN 1 IS OPERATED) |
|---|---|---|---|
| (NORMAL LAYOUT) 1. AIR CONDITIONER SCREEN 1 2. NAVIGATION SCREEN | 1. AIR CONDITIONER SCREEN 1 2. AIR CONDITIONER SCREEN 2 3. NAVIGATION SCREEN | 1. AIR CONDITIONER SCREEN 1 2. NAVIGATION SCREEN (NOT CHANGED) | |
| (NORMAL LAYOUT) 1. AIR CONDITIONER SCREEN 1 2. AV SCREEN 1 3. NAVIGATION SCREEN | 1. AIR CONDITIONER SCREEN 1 2. AIR CONDITIONER SCREEN 2 3. NAVIGATION SCREEN 4. AV SCREEN 1 | 1. NAVIGATION SCREEN 2. AIR CONDITIONER SCREEN 1 3. AV SCREEN 1 | 1. AV SCREEN 1 2. AV SCREEN 2 3. NAVIGATION SCREEN |

FIG. 24
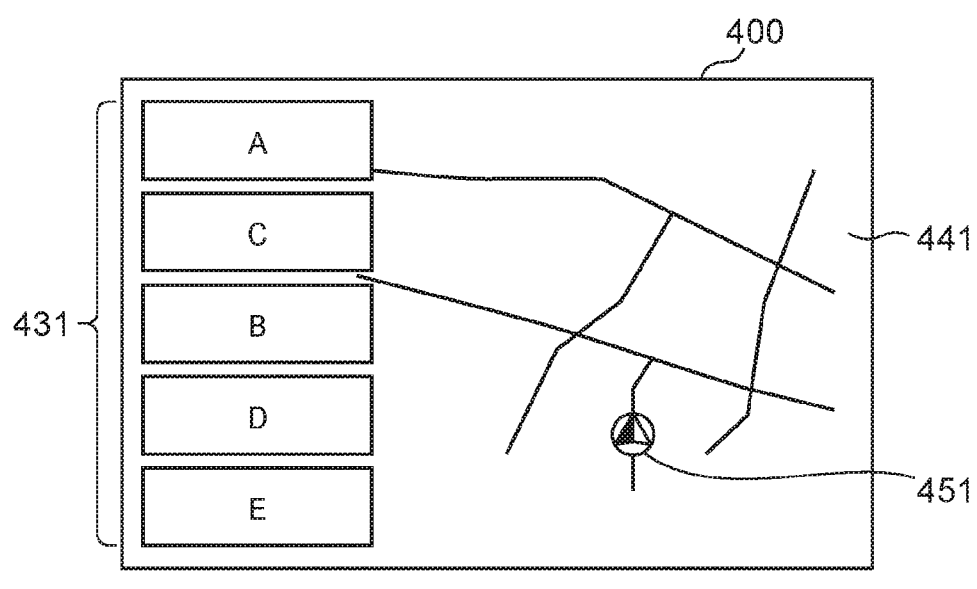
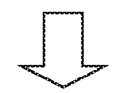 ARMREST SWITCH ON
TO FIG. 25
PRIOR ART

PRIOR ART

DISPLAY DEVICE

TECHNICAL FIELD

The present invention relates to a display device that displays content on a display integrated with a touch panel.

BACKGROUND ART

Various displays, large and small, are mounted on a vehicle for displaying various content such as a navigation screen and a soft key. A recent increase in the display size allows a plurality of contents to be displayed on one display at the same time.

However, a part of a display the driver finds it easy to view is not so large, meaning that it is difficult to display all contents in an easy-to-view part of a large display. For example, when operating a soft key displayed by the vehicle, the driver must operate the soft key while viewing it, unlike when operating a physical key. As the display becomes larger and, as a result, the distance to a soft key becomes larger, the soft key is not always displayed in an easy-to-view position.

Conventionally, a technology is known that makes easy a touch panel input operation (for example, see Patent Literature 1: Japanese Patent Application Publication No. 2008-129689). Patent Literature 1 discloses an input device that includes an armrest switch for detecting a user's hand; and input acceptance button display means for displaying, near the armrest switch, input acceptance buttons that are displayed on the display device when the armrest switch detects the user's hand.

FIGS. 24 and 25 are screen transition diagrams included in Patent Literature 1. When the driver presses an armrest switch, a display control unit displays input acceptance buttons 431 at the bottom of a display screen 400. Because a soft key is displayed near the driver's hand, the driver can press the soft key with the armrest switch as the fulcrum.

However, the problem with the input device described in Patent Literature 1 is that the displayed soft key is displayed in a predetermined manner. That is, the input device described in Patent Literature 1 displays, near the armrest switch, only the soft key that is displayed when the armrest switch is pressed but does not always display, near the armrest switch, the switch the driver wants to operate. As the display becomes larger, a plurality of contents are displayed on one display, sometimes with a plurality of soft keys included in the contents. In this case, it is preferable that the soft key the user preferentially wants to operate be displayed selectively in an easy-to-operate position. When a plurality of soft keys is displayed in the contents on the input device described in Patent Literature 1, all soft keys are reduced in size and are displayed near the armrest switch, in which case the driver is sometimes confused about which soft key is to be pressed.

Another problem is that the position near to the armrest switch is not always an easy-to-view position. In the case of a soft key, it is difficult to determine by touch which key is an intended key. One possible solution to this problem is to arrange the position of the armrest switch in the vehicle interior so that a soft key is displayed in an easy-to-view position. In this case, however, another problem arises that the operation method for operating a soft key with the physical switch pressed does not always increase, but sometimes decreases, operability. That is, because the driver's body type varies from person to person, operating a soft key with a physical switch pressed results in a situation in which the soft key is not always displayed in a position where the driver finds it easy to operate or in a situation in which the driver finds it difficult to press the soft key.

In the meanwhile, a soft key need not always be displayed in a position where the driver finds it easy to view. This is because, when the driver does not operate a soft key, the content to be frequently viewed by the driver during driving, such as the navigation screen or the information about the indoor temperature, setting temperature, air volume, and sound volume, should be displayed in an easy-to-view position.

FIGS. 26 and 27 are examples of diagrams for showing that the optimum layout of content depends on the situation. In FIG. 26, the air volume of the air conditioner, the navigation screen, and the soft key are displayed in this order from top to bottom. This layout makes the driver feel easy to view the air volume of the air conditioner and the navigation screen during traveling but decreases the soft key operability. In FIG. 27, the air volume of the air conditioner, the soft key, and the navigation screen are displayed in this order from top to bottom. This layout allows the driver to confirm the soft key before operation but increases the line of sight movement amount for viewing the navigation screen.

As the display becomes large enough to display a plurality of contents, the content to be displayed in a high visibility position differs from situation to situation as described above. Therefore, on a display device capable of displaying a plurality of contents, it is efficient to variably lay out contents.

A plurality of contents is sometimes displayed on the menu screen of an information terminal with a touch panel. However, changing this layout involves a complex operation. In addition, some information terminals display a plurality of contents when the user touches the desktop screen or the standby screen on which no content is displayed. However, the layout of such a screen is predetermined and, therefore, it is difficult to preferentially display a part of the contents in a high visibility position.

Patent Literature 1: Japanese Patent Application Publication No. 2008-129689 (JP 2008-129689 A)

SUMMARY OF THE INVENTION

Problem to be Solved by the Invention

In view of the foregoing, the present invention provides a display device capable of displaying a plurality of contents at the same time wherein both the operability and the visibility of content used by the user are increased.

Means for Solving the Problem

The present invention is characterized in that a display device for displaying content on a display, integrated with a touch panel, includes position detection means for detecting a position indicated on the display; and content layout determination means for determining a layout of a plurality of contents displayed on the display wherein, when the position detection means detects that a predetermined position on the display is indicated or a display position of a predetermined content is indicated, the content layout determination means moves at least one of displayed contents, based on a priority of displayed contents predetermined according to the display contents displayed on the display, and displays a soft key at a position where a line of sight movement amount is smaller than a line of sight movement amount of the content.

Effects of the Invention

According to the present invention, the display device capable of displaying a plurality of contents at the same time is provided wherein both the operability and the visibility of content used by the user are increased compatibly.

BRIEF DESCRIPTION OF THE DRAWINGS

FIG. 4 is an example of a functional block diagram of a navigation ECU.

FIG. 5 is an example of a diagram showing the display positions of contents in the normal layout.

FIG. 6 is a diagram showing an example of a content height table.

FIG. 8 is a diagram showing an example of a link table that links contents with each other.

FIG. 10 is an example of a diagram showing the display positions of contents in the operation layout.

FIG. 14 is an example of a diagram showing the relation between a pointing device and the display.

FIG. 18 is an example of a diagram showing a display position table in which the display positions of contents in the operation layout are registered.

FIG. 23 is a diagram showing an example of a table in which the correspondence among display contents in the normal layout, display contents in the operation layout, and their display order is stored.

FIG. 24 is a screen transition diagram shown in Patent Literature 1.

DESCRIPTION OF THE REFERENCE NUMERALS

12 Display
20 Navigation ECU
23 Touch panel
31 Device driver
33 Content layout unit
40 Table
100 Display device

MODES FOR CARRYING OUT THE INVENTION

The modes for carrying out the present invention are described below with reference to the drawings.

Figure 1:
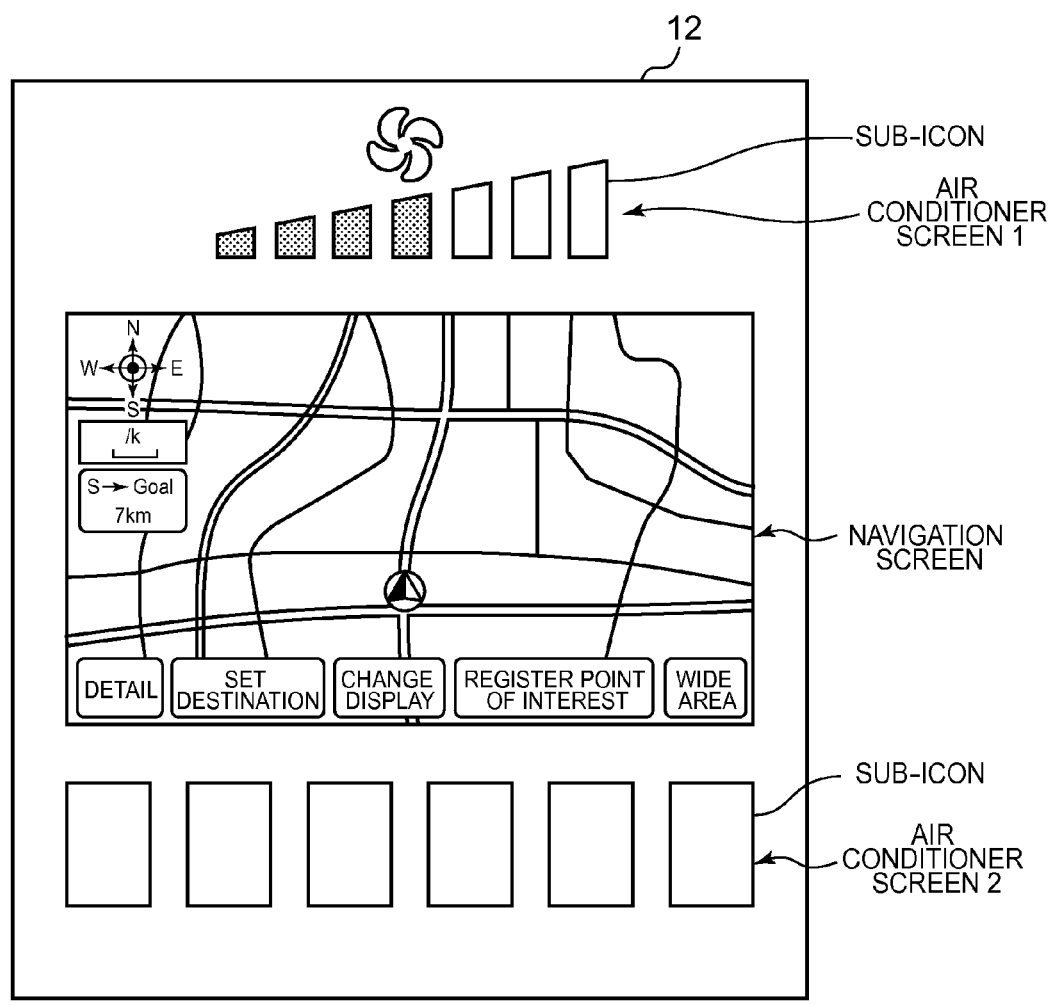
FIG. 1 is a diagram showing an example of a normal layout.

FIG. 1 is an example of a diagram showing the characteristic outline of a display device in this embodiment. In this embodiment, the layout of contents provided for the driver only to view the display during traveling (layout with emphasis on content viewing rather than on soft key operation) is called a "normal layout" while the layout of contents provided for the driver to operate a soft key (layout with emphasis on soft key operation rather than on content viewing) is called an "operation layout".

Figure 2:
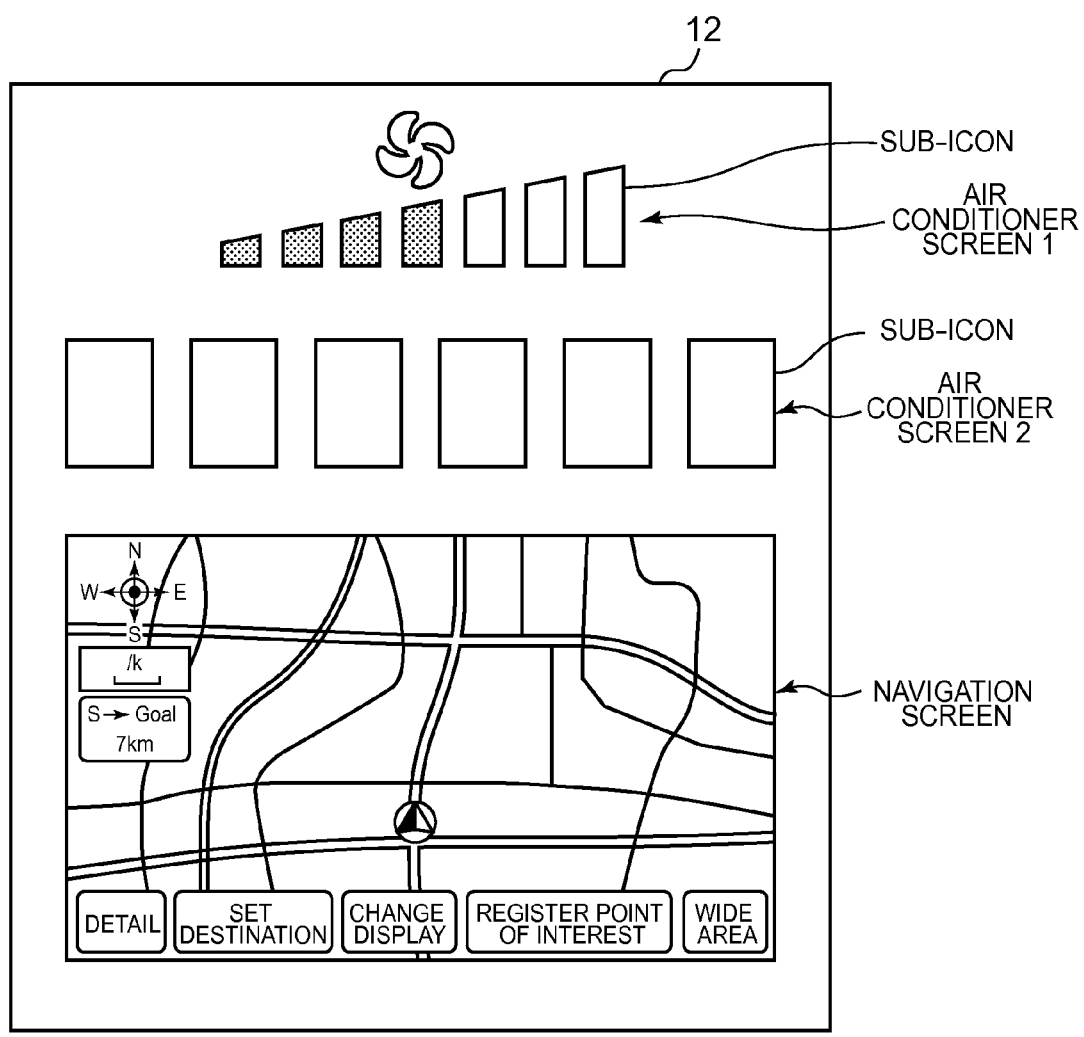
FIG. 2 is a diagram showing an example of an operation layout.

FIG. 1 shows an example of the normal layout, and FIG. 2 shows an example of the operation layout, respectively. Both layouts include the same types of display contents: air volume icon (hereinafter called an air conditioner screen 1), a navigation screen, and a switch icon (hereinafter called an air conditioner screen 2). The air conditioner screen 2 is a soft key for accepting an operation.

First, in this embodiment, a part of a display 12 (especially a large display) where the driver's line of sight movement amount is small during traveling is defined as a high visibility position. It is assumed that the driver can easily view content in a high visibility position and that the driver can easily operate a soft key in a high visibility position (for example, the driver can operate a soft key while viewing it).

When a portrait display is arranged on the center console, the driver's line of sight 10' movement amount becomes smaller as it gets closer to the top of the display 12. When a landscape display is arranged on the center console or on the meter panel, the driver's line of sight movement amount becomes smaller as it gets closer to the side of the display 12 nearer to the driver's seat (right side on right-hand drive vehicle).

As described above, a high visibility position, which means a position where the driver's line of sight movement amount is "smaller", is a position that is relatively determined. Therefore, the high visibility position is not a determined position that is above, or to the right side of, particular coordinates nor is it necessarily a position at the top end or at the extreme end.

Because FIGS. 1 and 2 show an example of a portrait display, the closer the position is to the top, the higher the visibility is. Therefore, in the normal layout shown in FIG. 1, the air conditioner screen 1, navigation screen, and air conditioner screen 2 are laid out in this order from top to bottom. Any of the air conditioner screen 1 and the navigation screen may be arranged at the top. In the normal layout, the driver can view the air conditioner screen 1 and the navigation screen, which are frequently referenced during traveling, with a smaller line of sight movement amount.

In the operation layout shown in FIG. 2, the air conditioner screen 1, air conditioner screen 2, and navigation screen are laid out in this order from top to bottom. In the operation layout specifically configured for the driver to operate a soft key, the driver can confirm and operate the air conditioner screen 2 with a smaller line of sight movement amount. As evident from the comparison between FIG. 1 and FIG. 2, the air conditioner screen 2 is arranged at the position in the operation layout where the navigation screen is arranged in the normal layout.

Because the priority of the air conditioner screen 2, which is a soft key, is higher than that of the navigation screen in the operation layout, the air conditioner screen 2 is arranged above the navigation screen. In this way, the configuration of the operation layout is characterized in that a content, arranged in a high visibility position in the normal layout, is replaced by a soft key.

The air conditioner screen 1 is arranged at the top in the operation layout, because the air conditioner screen 2 is assumed a soft key for operating the air conditioner. This layout allows the driver to operate the soft key while confirming the operation result on the air conditioner screen 1. Therefore, depending upon the operation target of a soft key, the air conditioner screen 1 may be arranged, for example, at the bottom.

To change the normal layout to the operation layout, the driver enters into the display device an intention to operate a soft key. For example, the driver enters an intention by:
(i) Touching the display (touch panel) 12
(ii) Touching a content
(iii) Bringing driver's hand close to the display 12

In the case of (i), if only one soft key is arranged in the normal layout, the soft key is arranged in a high visibility position. If two or more soft keys is arranged in the normal layout, they are arranged in a high visibility position according to the content priority. In the case of (ii), the content the driver touches is arranged in a high visibility position. If the content the driver touches is a soft key, the soft key is moved to the upper part and the driver follows the moved soft key. Therefore, it is ideal to design the layout such that, when the driver touches a content associated with a soft key, the soft key moves to the upper part. The air conditioner screen 1 and the air conditioner screen 2 shown in FIG. 1 are in this relation; that is, when the driver touches the air conditioner screen 1 in the normal layout, the air conditioner screen 2 is arranged in the upper part (immediately below the air conditioner screen 1) in the operation layout. In the case of (iii), the processing is similar to that in (i) or (ii). That is, after the sensor detects the appropriate position of a hand, the processing similar to that in (ii) can be performed.

The switching from the operation layout to the normal layout is triggered by one of the following two conditions.
(i) A predetermined time has elapsed after the driver terminates the operation of a soft key.
(ii) The driver performs the operation to return the layout to the normal layout.

That is, the driver can return the layout to the operation layout simply by terminating the operation of a soft key. In addition, to confirm the navigation screen in the normal layout, the driver can immediately return the layout to the operation layout.

First Embodiment

Example of Configuration

Figure 3:
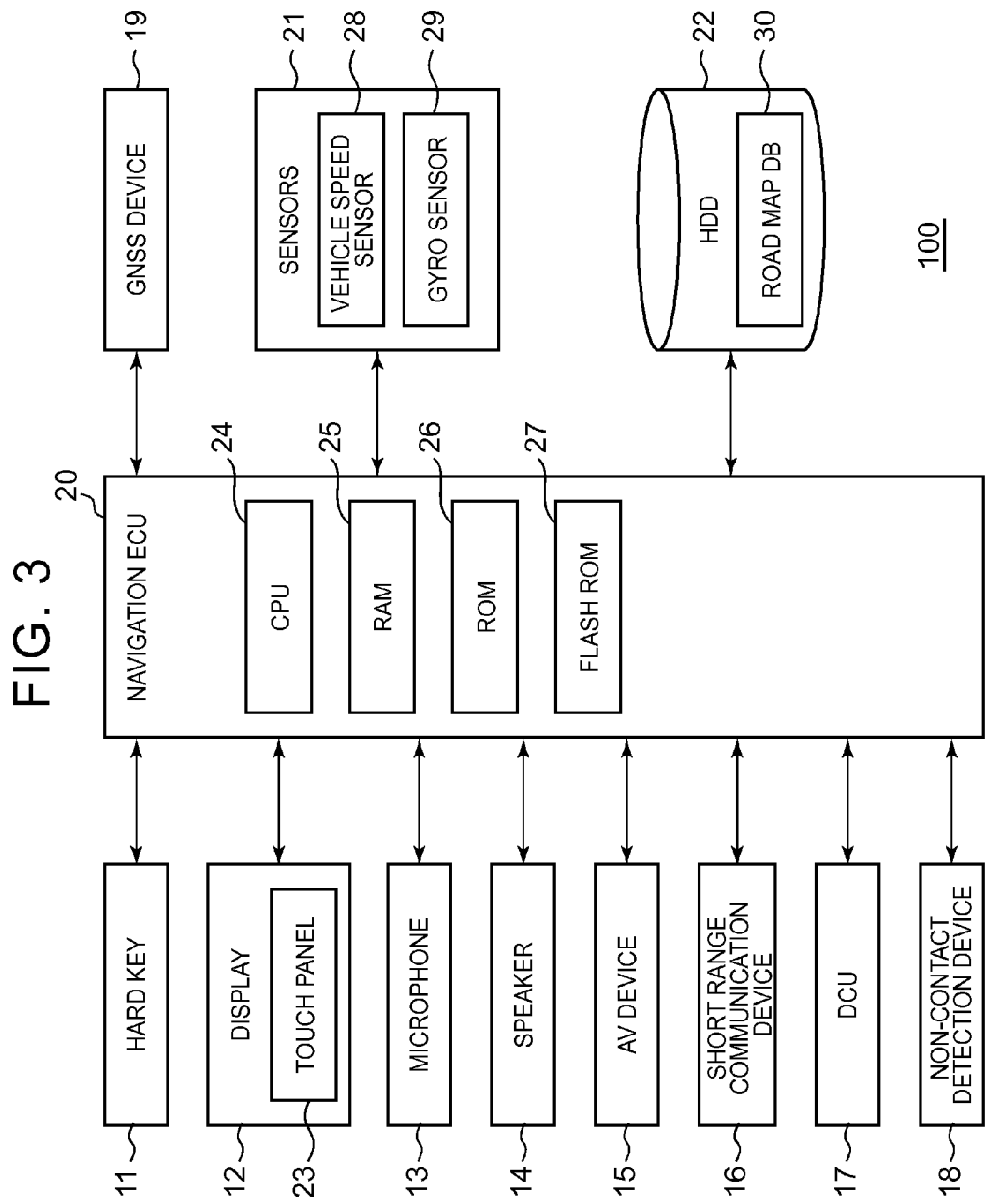
FIG. 3 is an example of a configuration diagram of a display device.

FIG. 3 is an example of a configuration diagram of a display device 100. The display device 100 is controlled by a navigation ECU 20. To the navigation ECU (Electronic Control Unit) 20, a hard key 11, a display 12, a microphone 13, a speaker 14, an AV device 15, a short range communication device 16, a DCM (Data Communication Module) 17, a non-contact detection device 18, a GNSS (Global Navigation Satellite Systems) device 19, sensors 21, and a HDD 22 are connected.

The navigation ECU 20 has the function similar to that of a standard microcomputer, such as a CPU 24, a RAM 25, a ROM 26, and a flash ROM 27. The navigation ECU 20 can communicate with other ECUs via the CAN (Controller Area Network) bus. Some blocks shown in the figure are connected via the CAN bus.

The hard key 11, composed of frequently used switches, includes buttons such as a power button, a volume adjustment button, and a button for displaying the menu of the AV device 15. Although the function of the hard key 11 may overlap with the function of a soft key that will be described later, this embodiment describes a situation in which the driver operates a soft key. The display 12 is a liquid crystal or organic-EL flat panel display with an integrated touch panel 23. The display 12 is a device for displaying the content described above. It is assumed that a display having a length or a width longer than that defined by the aspect ratio of a general standard (for example, SVGA, etc.) is mounted. The display need not always have a non-standard ratio, but a large display (for example, 8 to 10 inches or larger) with the standard aspect ratio may also be used. The touch panel 23, which detects the driver's operation position and outputs the detected operation position to the navigation ECU 20, can detect two or more detection positions at the same time.

When the steering switch is turned on, the microphone 13 starts sound collection and then converts the driver's voice to an electric signal. The microphone 13 performs voice recognition for converting voice to text data, and outputs the converted text data to the navigation ECU 20. Voice commands are registered in the navigation ECU 20 and, when the text data matches a voice command, the processing corresponding to the voice command is performed. The normal layout and the operation layout may be switched with each other via voice. The speaker 14 outputs route guidance and a warning sound under control of the navigation ECU 20. For example, when the vehicle approaches a point at which the traveling direction is changed according to the route to the destination, the speaker 14 outputs voice guidance. In addition, the speaker 14 outputs information about an approach to an obstacle or about congestion.

The AV device 15 performs processing such as radio program reception, music playback, TV program reception, and BD (Blu-Ray Disk) playback. The AV device 15 outputs video to the display 12, and sound to the speaker 14, respectively. The AV device 15 acquires an instruction about a driver-selected video/sound source and a reception channel (channel selection) from the navigation ECU 20 and switches the video/sound source from which video/sound is played-back and received.

The short range communication device 16, such as a Bluetooth (registered trademark) communication device, communicates with a mobile terminal carried by the driver. This allows the driver to perform hands-free talking using the microphone 13, speaker 14, navigation ECU 20, short range communication device 16, and the mobile terminal. This also allows the navigation ECU 20 to play back music data, stored in the mobile terminal, for output from the speaker 14.

The DCM 17, a communication device that communicates with a base station of a communication carrier, performs communication using a communication method similar to that of a mobile phone, wireless LAN, and WiMAX. This allows for connection to the Internet and enables the navigation ECU 20 to display a web page using a browser, to receive software, or to send vehicle information, such as vehicle speed information or failure information, to a maker. The DCM 17 also allows for talking with an operator at a support center with which the driver has a contract.

The non-contact detection device 18 detects the position of an occupant's hand in the space above the display 12. For example, the non-contact detection device 18 is configured by an infrared sensor, camera and image analysis device, ultrasonic sensor, and electrostatic capacity detection device. In addition, using a shoulder-position contact sensor built in a seat, the non-contact detection device 18 can estimate that the driver stretches out his or her hand to the space above the display 12.

The GNSS device 19 detects the coordinates (longitude, latitude, altitude) of the vehicle using an electric wave transmitted from an artificial satellite. The navigation ECU 20 identifies the current vehicle position by correcting the position information, detected by the GNSS device 19, using the signal detected by the sensors 21. The sensors 21, which include a vehicle speed sensor 28 and a gyro sensor 29, identify the direction of the vehicle at the position detected by the GNSS device 19 and, at the same time, accumulate the travel distances from the vehicle speed for accurately calculating the current position. The navigation ECU 20 further matches the vehicle position with a point on the road map to arrange the vehicle accurately on a road on the navigation screen.

A road map DB 30 is stored in the HDD 22. In the road map DB 30, link data on roads (links), node data on node points (such as intersections, points that divide a road between intersections into equal distances), and facility data on various facilities are recorded, all in association with the position information. Node data has a node-connected link associated therewith and, therefore, a road network is configured by linking nodes and links. Attributes, such as a road width and whether the road is an open road or a freeway, are set in the link data.

[Function Description]

FIG. 4 shows an example of a functional block diagram of the navigation ECU 20. These functional blocks are implemented by the CPU 24 of the navigation ECU 20 by executing the programs, stored in the flash ROM 27 or the HDD 22, while working with the hardware.

First, a navigation screen creation unit 36 reads link data on the surroundings of the current vehicle position from the road map DB 30 stored in the HDD 22 and creates a navigation screen. Several soft keys are arranged on the navigation screen. In addition to the soft keys, buttons that have no input-accepting function are also displayed. At navigation screen creation time, there is no difference between the soft keys and those buttons.

A soft key, which is processed as an object, has an attribute and a method that are predetermined. The attribute of a soft key includes the layout position (top-left coordinates of the button), width, height, message (characters and symbols), message color, font, and color and width of the button frame. In this embodiment, the layout position is represented as a value relative to the top-left coordinates of each content. That is, the position of a soft key remains unchanged within each content and, when the content position is changed, the soft key position is automatically determined uniquely. The method describes the processing that is performed when each button is pressed.

An air conditioner screen creation unit 35 creates an air conditioner screen by creating the air conditioner screen 1 and the air conditioner screen 2 described above. In this manner, the air conditioner screen has two independently displayable screens. In addition to the air conditioner screen 1, a temperature icon (air conditioner screen 3) and a wind direction icon (air conditioner screen 4) are sometimes provided.

Several trapezoid sub-icons on the air conditioner screen 1 are colored differently according to the air volume. A sub-icon is also an object. The attribute of a sub-icon includes the layout position (top-left coordinates of the sub-icon), width, height, and sub-icon color. Similarly, the layout position of a sub-icon is represented as a value relative to the top-left coordinates of the air conditioner screen. Because the air conditioner screen 1 does not include a soft key, no method is described.

The air conditioner screen 2 has several rectangular sub-icons. The attribute of a sub-icon includes the layout position (top-left coordinates of each soft key), width, height, soft key color, message, message color, and font. Similarly, the layout position of a sub-icon is represented as a value relative to the top-left coordinates of the air conditioner screen 2. The method of a soft key on the air conditioner screen 2 differs according to the soft key. For example, the method describes air volume adjustment and setting temperature adjustment.

An AV screen creation unit 34 creates an AV screen, such as a display screen, a source selection screen, a selected-channel screen, and a channel selection screen, for a television screen or BD. Various soft keys, displayed on these screens, are created also as objects. The layout of a soft key is determined also as relative to an AV screen. The television screen and the navigation screen, each created as an AV screen, are sometimes displayed either side by side or in the picture-in-picture format in a screen with the size of the navigation screen. In this case, a soft key on the navigation screen is arranged relatively within the navigation screen, sometimes with its size reduced depending upon the layout.

The position of an object (soft key) on the navigation screen is known to a navigation control unit 39, the position of an object (soft key) on the air conditioner screens 1 and 2 is known to an air conditioner control unit 38, and the position of an object (soft key) on the AV screen is known to an AV control unit 37. Therefore, based on the information on a position where the user performs operation on the touch panel 23, each control unit can identify a method to be executed for performing the control operation.

The navigation screen, air conditioner screens 1 and 2, and AV screen have their layout positions on the display 12 determined, and are arranged on the display 12, by the content layout unit 33. Instead of this, the navigation screen creation unit 36, air conditioner screen creation unit 35, and the AV screen creation unit 34 may arrange the screens at the layout positions specified by the content layout unit 33. The content layout unit 33 determines the layout of the screens in each of the normal layout and the operation layout.

The touch panel 23 may detect a position in any method. For example, the resistive film method and the electrostatic capacity method are known. As with the operation of a keyboard or a mouse, an event (interrupt) is generated when the touch panel 23 is pressed, and the pressed position is identified by a device driver 31. The device driver 31 can detect the position immediately after the user touches the touch panel 23, the position while the user keeps touching the touch panel 23, and the position when the user lifts the finger from the touch panel 23. The device driver 31 stores the position information in the message queue provided by the OS or the middleware. The functions in this embodiment (operation determination unit 32 in the figure) obtain the position information from the message queue to detect the position on the display 12 the driver has touched.

<Normal Layout>

The normal layout is described below. FIG. 5 is an example of a diagram showing the display position table that determines the display positions of contents in the normal layout. The display position table is stored in tables 40. In FIG. 5, the display order of the contents is registered in association with the display contents. The display contents are clearly identified based on the devices the user has started. The display order is the descending display order beginning with the highest visibility position. When the display is the portrait display 12, the display order is from top to bottom.

For example, when the navigation screen and air conditioner screens 1 and 2 are the display contents as shown in FIGS. 1 and 2, the contents are displayed in the order of:
1. Air conditioner screen 1
2. Navigation screen
3. Air conditioner screen 2

When the navigation screen and the AV screen are the display contents, the contents are displayed in the order of:
1. Navigation screen
2. AV screen The content layout unit 33 determines the display positions of contents according to the display order in the normal layout that is predetermined as described above.

Figure 7:
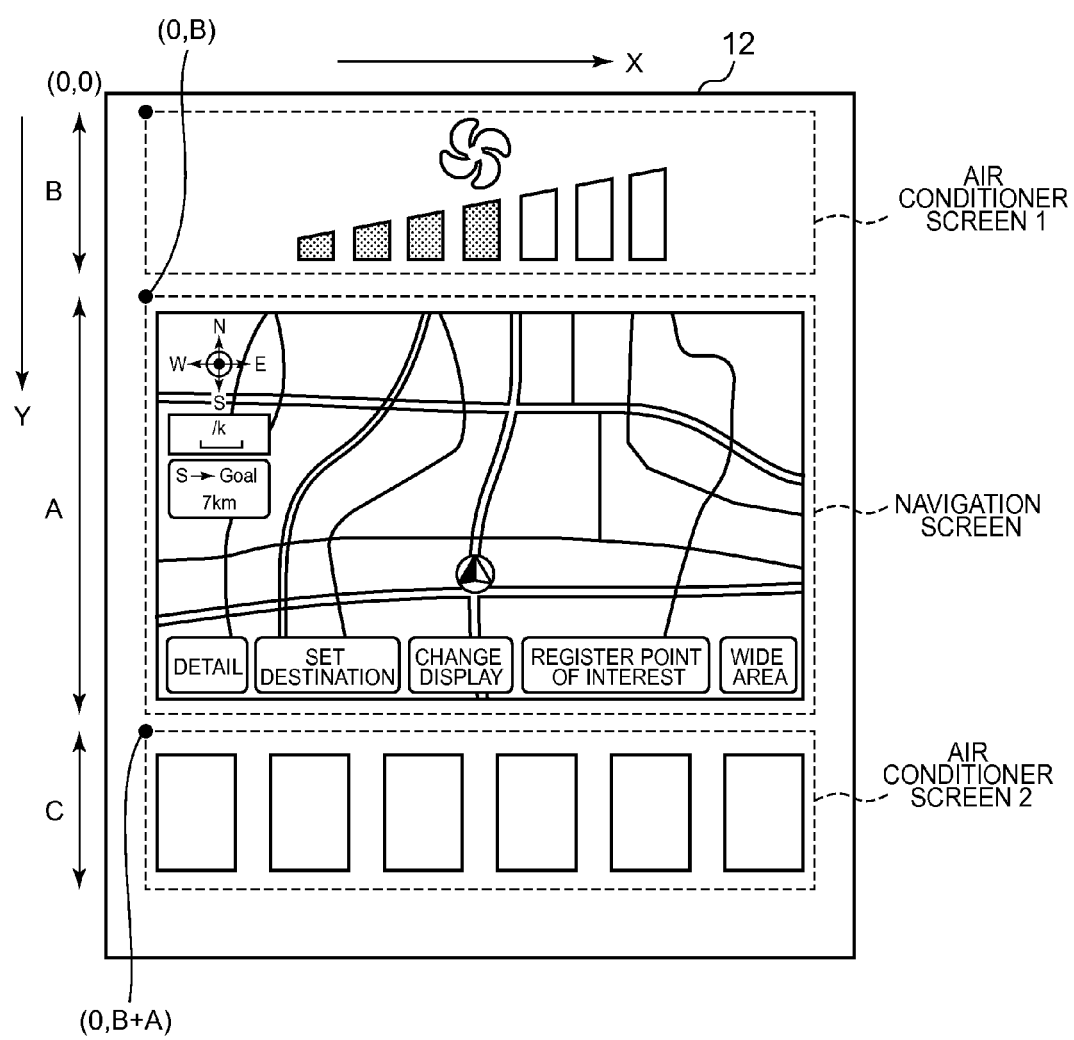
FIG. 7 is an example of a diagram showing the display positions of contents.

The display position of each content is determined as the top-left coordinates of the content. FIG. 7 is an example of a diagram showing the display positions of contents. In the figure, with the pixel positions on the display 12 as the coordinates, the top-left position is the origin (0, 0), the axis in the right direction is the X-axis, and the axis in the downward direction is the Y-axis. Because the content height varies from content to content in many cases, the display position of each content depends on the contents arranged above that content. To accurately identify the display position, the content layout unit 33 references a content height table in FIG. 6 that is registered in the tables 40. For example, the height of the navigation screen is A, the height of the air conditioner screen 1 is B, the height of the air conditioner screen 2 is C, and the height of the AV screen is D. The height is represented by the number of pixels.

Therefore, the content layout unit 33 determines the display positions of the content as follows.

When the display contents are the navigation screen, air conditioner screen 1, and air conditioner screen 2 in the normal layout (in the case of FIG. 7)
Display position of air conditioner screen 1=0
Display position of navigation screen=B
Display position of air conditioner screen 2=B+A When the display contents are the navigation screen and AV screen
Display position of navigation screen=0
Display position of AV screen=A In this manner, the content layout unit 33 (or navigation screen creation unit 36, air conditioner screen creation unit 35, and AV screen creation unit 34) can arrange the contents in the predetermined positions in the normal layout.

The content layout unit 33 (or navigation screen creation unit 36, air conditioner screen creation unit 35, and AV screen creation unit 34) notifies the display positions in the normal layout to the navigation control unit 39, air conditioner control unit 38, and AV control unit 37. Each control unit adds the layout position of each soft key to the display position to determine the soft key pressed by the driver.

<Whether to Perform Operation in Normal Layout>

Because a soft key is displayed also in the normal layout, it is possible for the driver to operate the soft key without having to switch to the operation layout. On the other hand, if the layout is unintentionally switched to the operation layout during an operation in the normal layout, the driver must search for a soft key or change the position of the hand with the result that the operability is decreased. To avoid such a condition, this embodiment allows the driver to specify, for the display device 100, that "a specific operation, such as air volume adjustment, is not performed in the normal layout but is performed always after switching to the operation layout". If the driver specifies that a specific operation is not performed in the normal layout, there is no need for the display device 100 to determine whether the driver intends to perform a specific operation or to switch the layout. When the driver touches a content to be operated (for example, air conditioner screen 1 or air conditioner screen 2), the display device 100 switches the layout from the normal layout to the operation layout (the device is not controlled until the layout is switched to the operation layout).

<Switching from Normal Layout to Operation Layout>

If the driver specifies that a specific operation, such as air volume adjustment, is performed also in the normal layout, the display device 100 determines whether the driver intends to perform a specific operation or to switch the layout.

The following describes how the display device 100 determines whether the driver intends to perform a specific operation or to switch the layout. The position information means one of the following two: the operation of a specific device and the switching from the normal layout to the operation layout. The operation determination unit 32 determines which one of the above two the driver intends to perform, for example, in the following way.

1-(i) Determine that the driver intends to switch the layout if the touch position is an out-of-content part.
1-(ii) Determine that the driver intends to switch the layout if the touch position is included in a content and if the content is a predetermined content.
1-(iii) Determine that the driver intends to perform a specific operation in the other cases.

An out-of-content part, described in (i), is a part close to the ends in the X direction or close to the ends in the Y direction on the display 12. Even if the Y coordinate of a touch position corresponds to any of contents, the operation determination unit 32 can determine that the driver touches an out-of-content part. Such a usage method allows the user, who wants to operate a content, not in the normal layout but in the operation layout, to touch the end of the display 12 close to a content. The out-of-content part may include a part other than a soft key on a content (for example, a map part of the navigation or a blank part between soft keys). The driver can operate a content after the content layout changes to the operation layout. In the example in FIG. 7, when the driver touches a part around the air conditioner screen 2 on the display 12, the operation determination unit 32 determines that the driver touches an out-of-content part. More specifically, the operation determination unit 32 can determine that the driver touches an out-of-content part if the X coordinate of the position information is closer to zero than the threshold or closer to the maximum value than the threshold.

A predetermined content, described in (ii), is a content associated with a content to be displayed in a high visibility position in the operation layout.

FIG. 8 is a diagram showing an example of a link table that links contents with each other. In FIG. 8, the air conditioner screen 1 and the air conditioner screen 2 are linked, and the AV screen 1 and the AV screen 2 are linked, as a link relation. The air conditioner screen 1 and the AV screen 1 are "touch determination targets", and the air conditioner screen 2 and the AV screen 2 are "link targets". A "touch determination target" refers to a content that is determined whether the driver touches it, and a "link target" refers to a content linked to a "touch determination target" content.

Although not shown, it is also possible to set both a "touch determination target" and a "link target" to the "navigation screen" and, when the navigation screen is selected, to arrange the navigation screen at the top.

The operation determination unit 32 references the link table and, based on the position information, determines whether a "touch determination target" is pressed. If a "touch determination target" is pressed, the operation determination unit 32 determines that the driver intends to switch the layout. In this case, the content (soft key), which is a link target, is displayed in a high visibility position.

<Non-Contact Switching>

In this embodiment, the driver can switch the display device 100 from the normal layout to the operation layout without directly touching the display 12.

Figure 9:
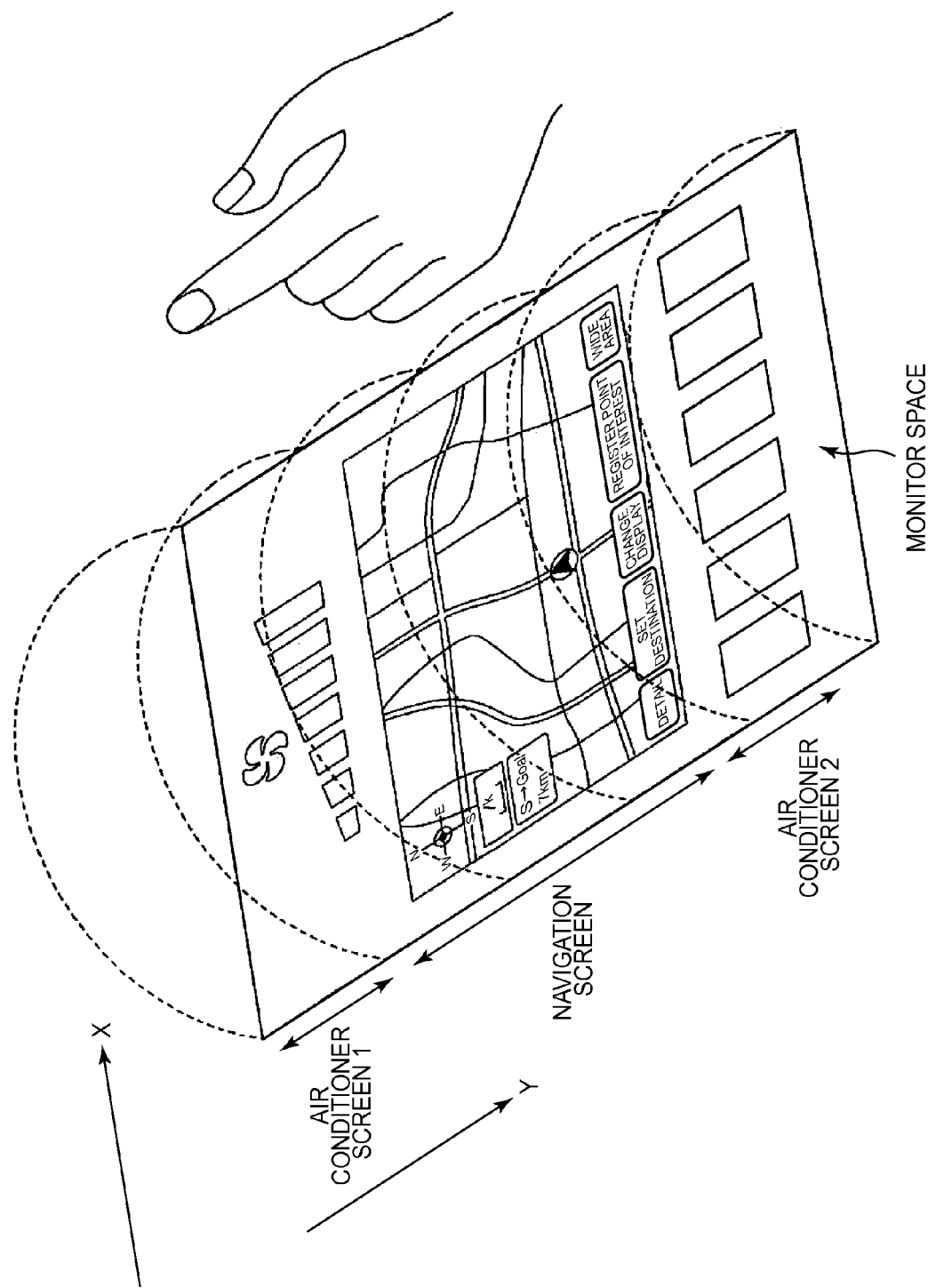
FIG. 9 is an example of a diagram showing the position of a driver's hand detected by a non-contact detection device.

FIG. 9 is an example of a diagram showing the position of the driver's hand detected by the non-contact detection device 18. The non-contact detection device 18 monitors the space several centimeters to several tens of centimeters above the display 12 for detecting an object that enters the space. The device driver 31 notifies the information on the approximate position in the Y-direction to the operation determination unit 32.

In this case, too, the driver wants to operate the navigation screen in the normal layout in one case, and the soft key at the bottom of the display 12 in another case. Therefore, the operation determination unit 32 determines what operation the driver intends to perform as follows.

2-(i) Determine that the driver intends to switch the operation layout if the approximate position information in the Y direction indicates a position close to a predetermined content.

2-(ii) Determine that the driver intends to switch to the operation layout if the approximate position information in the Y direction indicates a position close to the bottom (for example, a position included in the bottom half to bottom one-third of the whole length).

A predetermined content, described in 2-(i), refers to a "touch determination target" content. The driver, who wants to operate a soft key in the lower part, moves the hand across the space above the content (touch determination target) associated with the soft key. This causes the "link target" content, associated with the "touch determination target", to be displayed in the upper part of the display, enabling the driver to operate the soft key, displayed in a high visibility position, with the minimum movement of the hand.

In the case of 2-(ii), the driver, who wants to operate a soft key, moves the hand across the space above the lower part of the display 12, where the soft key to be operated is displayed, and then the driver can operate the soft key displayed in a high visibility position. That is, the driver is required only to move the hand in the space above the lower part of the display 12, allowing for an intuitive operation.

When the operation described in 2-(ii) is made possible, the driver cannot operate a soft key in the lower part of the display 12 with the display in the normal layout. To prevent this, the driver may specify a setting that prevents the operation described in 2-(ii) from being accepted.

If the position information indicates a position that does not correspond to the positions described in 2-(i) and 2-(ii) but to a position approximately in the center in the Y direction, the driver can operate a content with the display in the normal layout. For example, a content already displayed in a high visibility position, such as the navigation screen, can be operated with the display in the normal layout.

<Operation Layout>

Next, the following describes how the content layout unit 33 determines the operation layout when the operation determination unit 32 determines to switch the layout from the normal layout to the operation layout. The content layout unit 33 in this embodiment switches the layout to the predetermined operation layout according to the type of content displayed in the normal layout.

Immediately after the driver turns on the switch of each device (such as an air conditioner), it is desirable for the display device 100 to display contents in the operation layout. After the driver terminates the operation, the layout is switched to the normal layout.

FIG. 10 is an example of a diagram showing a display position table in which the display positions of contents in the operation layout are registered. The display position table is registered in the tables 40. In FIG. 10, the display order in the operation layout is registered in association with the display contents that are the same as those in the normal layout in FIG. 5.

For example, when the navigation screen and the air conditioner screens 1 and 2 are the display contents in the normal layout, they are displayed in the operation layout in the following order.

1. Air conditioner screen 1
2. Air conditioner screen 2
3. Navigation screen The normal layout and the operation layout need not always be different but may be the same in some cases That is, in some cases, there is no operation layout corresponding to the normal layout. The content layout unit 33 determines the display positions of the contents, based on the display order and the heights of the contents, in the same manner as in the normal layout.

The content layout unit 33 (or navigation screen creation unit 36, air conditioner screen creation unit 35, and AV screen creation unit 34) notifies the display positions in the operational layout to the navigation control unit 39, air conditioner control unit 38, and AV control unit 37. Each control unit adds the layout position of each soft key to the display position to determine the soft key operated by the driver.

[Operating Procedure]

Figure 11:
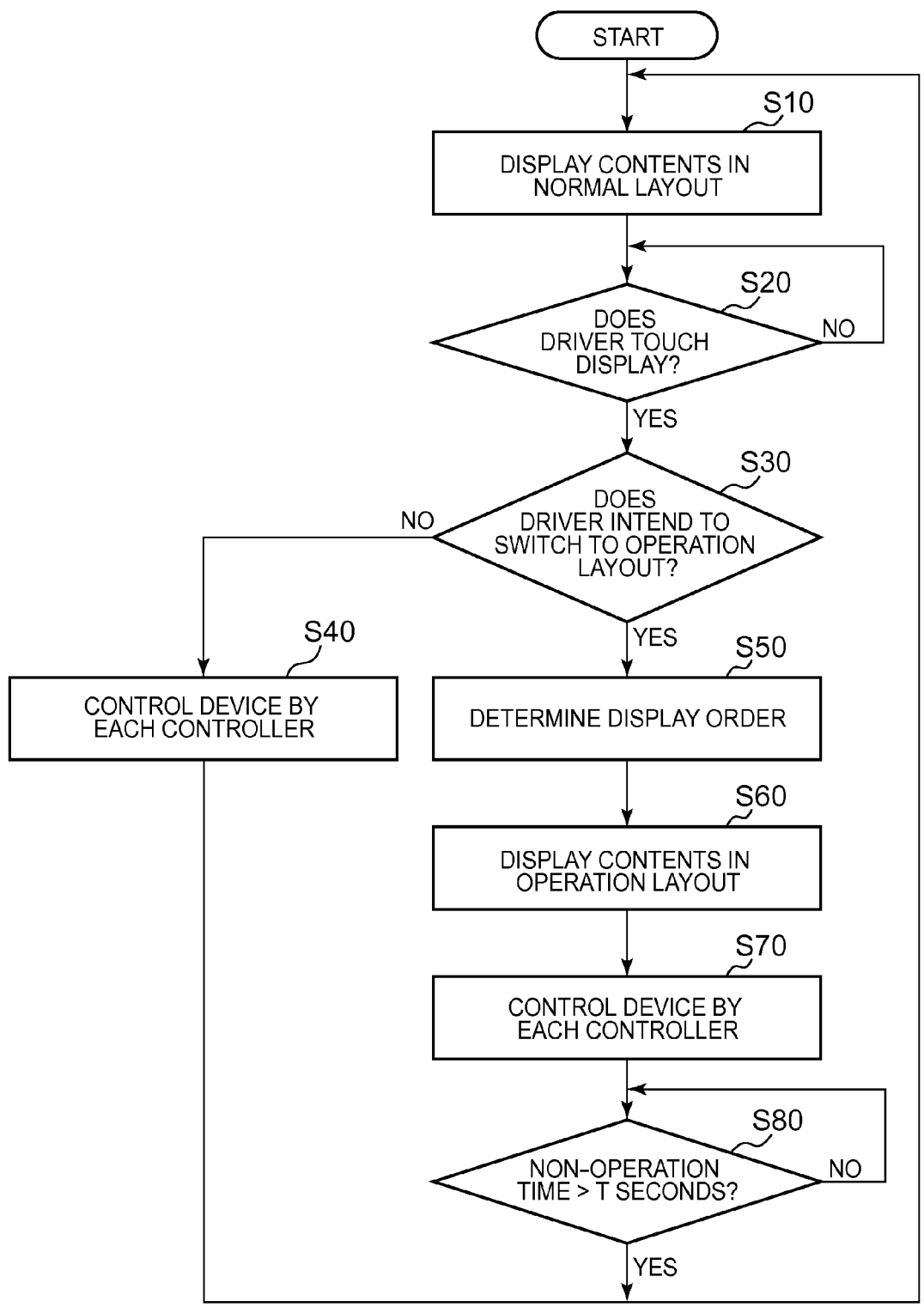
FIG. 11 is an example of a flowchart showing the procedure performed by the display device to switch from the normal layout to the operation layout and vice versa.

FIG. 11 is an example of a flowchart showing the procedure performed by the display device 100 to switch the layout from the normal layout to the operation layout and vice versa. The procedure shown in FIG. 11 is executed repeatedly while the display device 100 displays content on the display 12. For example, though the layout is the operation layout immediately after the driver turns on the switch of the air conditioner, the contents are displayed in the normal layout when the driver terminates the operation (S10).

The operation determination unit 32 determines whether the driver touches the display 12 in the normal layout (S20). If the driver does not yet touch the display 12 (No in S20), the display device 100 continues to display the contents in the normal layout.

If the driver touches the display (Yes in S20), the operation determination unit 32 determines whether the driver intends to switch to the operation layout (S30). The operation determination unit 32 determines whether the driver intends to switch to the operation layout based on the position information on the position the driver has touched.

If the driver does not intend to switch to the operation layout (No in S30), the navigation control unit 39, air conditioner control unit 38, or AV control unit 37 controls the navigation device, air conditioner, or the AV device 15 respectively based on the position information (S40).

If the driver intends to switch to the operation layout (Yes in S30), the content layout unit 33 determines the display positions of the contents in the operation layout based on the types of displayed contents (S50).

Next, the content layout unit 33 displays the contents in the display positions in the operation layout (S60). In addition, beginning at the time the contents are displayed in the display positions in the operation layout, the content layout unit 33 starts measuring the non-operation time. The non-operation time is initialized when the driver touches the display 12.

The operation determination unit 32 sends the position information to each controller or to a controller corresponding to the position information, assuming that an operation in the operation layout is a specific operation. The navigation control unit 39, air conditioner control unit 38, or AV control unit 37 controls the navigation device, air conditioner, or AV device, respectively, based on the position information (S70).

The content layout unit 33 determines whether the non-operation time exceeds T seconds (S80). Until the non-operation time exceeds T seconds, the operation layout is continued.

If the non-operation time exceeds T seconds (Yes in S80), the content layout unit 33 determines the display positions of the contents in the normal layout and displays the contents (S10).

As described above, the display device 100 in this embodiment can display the navigation screen in a high visibility position during traveling and, at the same time, display a soft key in a high visibility position during operation, thus ensuring compatibility between operability and visibility.

[Landscape Display]

Figure 12:
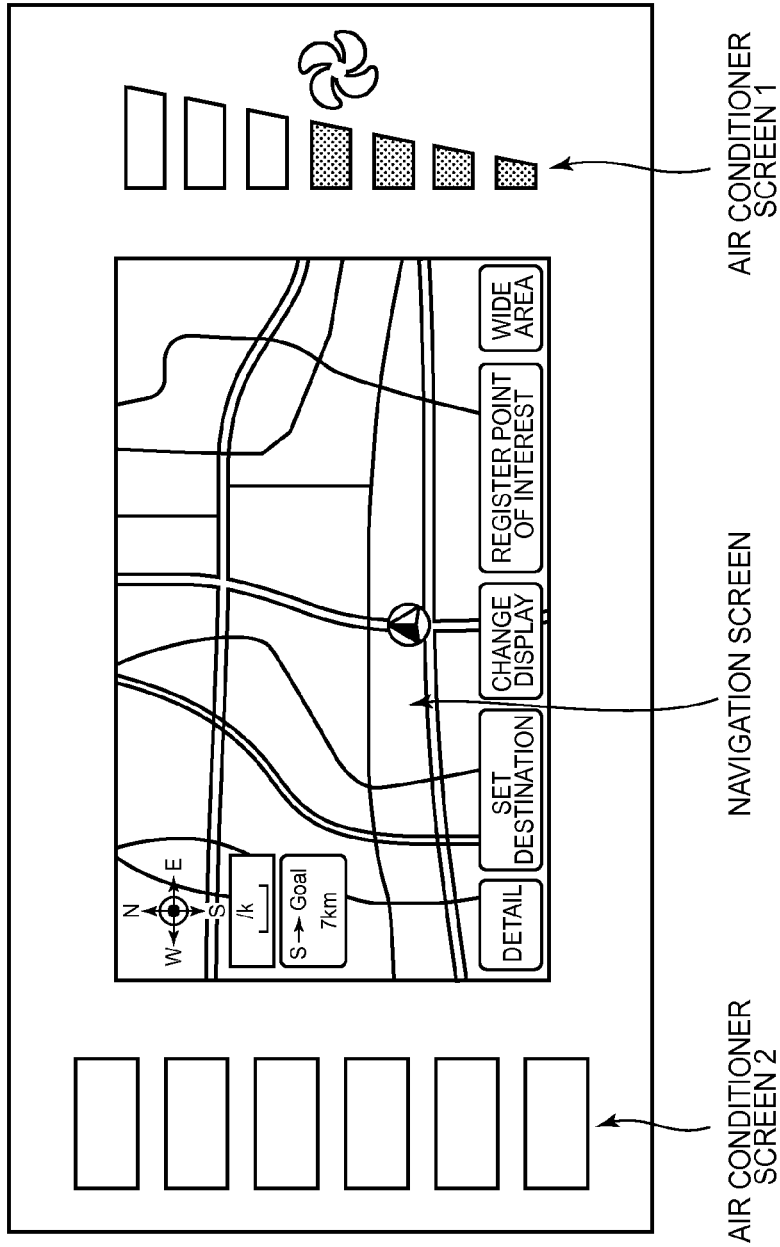
FIG. 12 is an example of a diagram showing the normal layout and the operation layout on a landscape display.
Figure 13:
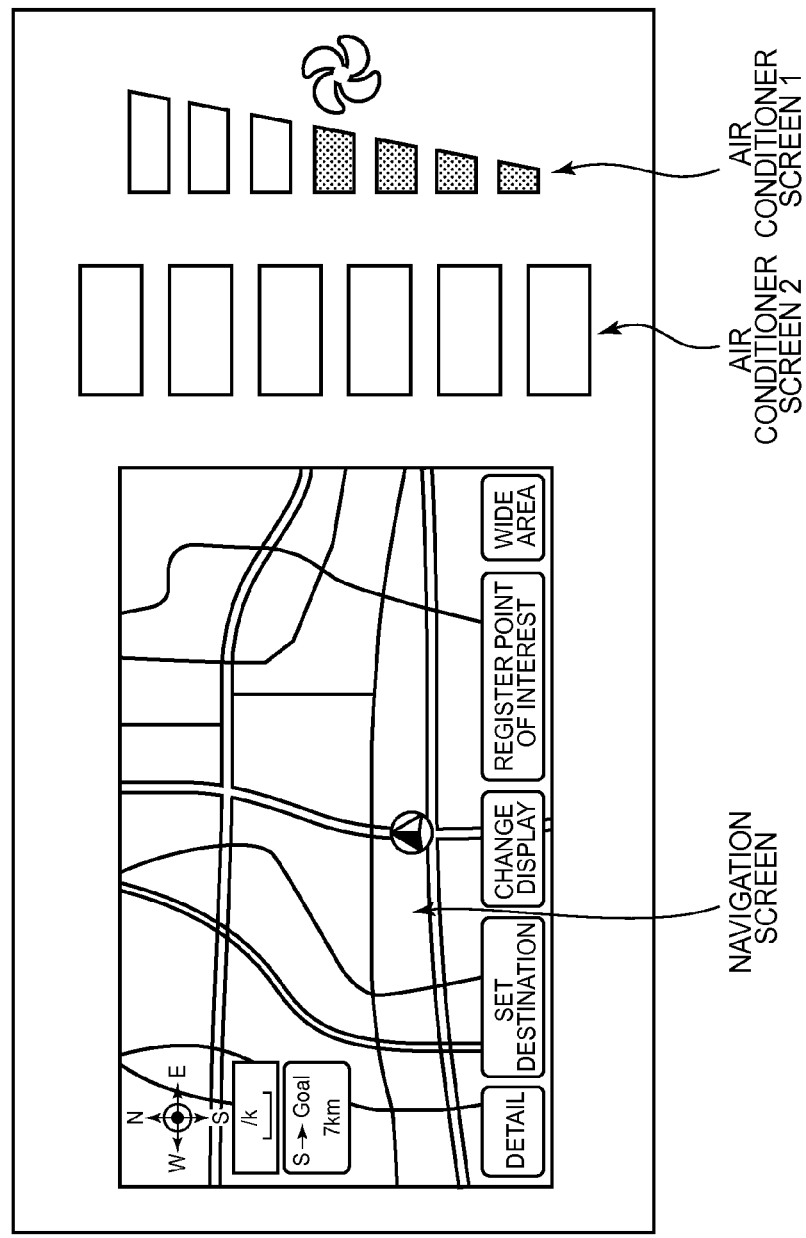
FIG. 13 is an example of a diagram showing the normal layout and the operation layout on a landscape display.

FIGS. 12 and 13 are examples of diagrams showing the normal layout and the operation layout on the landscape display 12. In this case, the contents are arranged side by side. The contents can be created in the same manner as on the portrait display 12 except that their shapes and character orientations are designed for the horizontal-type display 12.

For example, on a right-hand drive vehicle where the driver's seat is on the right side, the high visibility position is on the right side. Therefore, in the normal layout, the screens are displayed in the order of the air conditioner screen 1, navigation screen, and air conditioner screen 2 from right to left. In the operation layout, the screens are displayed in the order of the air conditioner screen 1, air conditioner screen 2, and navigation screen from right to left.

Whether to switch from the normal layout to the operation layout is determined according to the determination criteria described in 1-(i)-1-(iii) and 2-(i) to 2-(ii), as is the case when the display 12 is a portrait display.

[Operation Via Pointing Device]

In addition to the operation method in which the driver directly touches the display 12, the driver can operate a content using a predetermined pointing device in some cases.

FIG. 14 is an example of a diagram showing the relation between a pointing device and the display 12. A touch pad 32 is arranged below the display 12. The touch pad 32 senses the position where the driver's fingertip touches the pad. The display device 100 monitors the position and moves a cursor 31 displayed on the display 12. When the driver taps (or double taps) on the pad, the touch pad 32 detects the tap position. Therefore, the tap position has the information equivalent to the position information detected by the touch panel 23. The operation via the touch pad 32 is applicable also to the landscape display 12.

Therefore, the operation determination unit 32 can determine which operation, a specific operation or a switching operation, the user intends to perform as when the touch panel 23 is pressed.

3-(i) Determine that the driver intends to switch the layout if the tap position is an out-of-content part.
3-(ii) Determine that the driver intends to switch the layout if the tap position is included in a content and if the content is a predetermined content.
3-(iii) Determine that the driver intends to perform a specific operation in the other cases.

The content layout unit 33 determines the display positions of the contents in the normal layout and the operation layout as when the touch panel detects the position information.

Second Embodiment

In the first embodiment, even when a plurality of contents that include two types of soft key, one for each, is displayed in the normal layout, one operation layout is determined based on the priority of soft keys. In this embodiment, a display device 100 is described that can display contents in different operation layouts even when the types of displayed contents are the same.

When there is a plurality of soft keys, the user explicitly specifies a soft key to be operated in one case, but not in another case. Therefore, when it is determined to switch the layout to the operation layout, the content layout unit 33 selects the operation layout as follows.

4-(i) Give priority to a "link target" linked to a "touch determination target" when the driver touches the "touch determination target".
4-(ii) When the driver touches a non-content part
 Display a specific soft key in a high visibility position.
 Display a soft key, displayed last in a high visibility position, again in a high visibility position.

Figure 15:
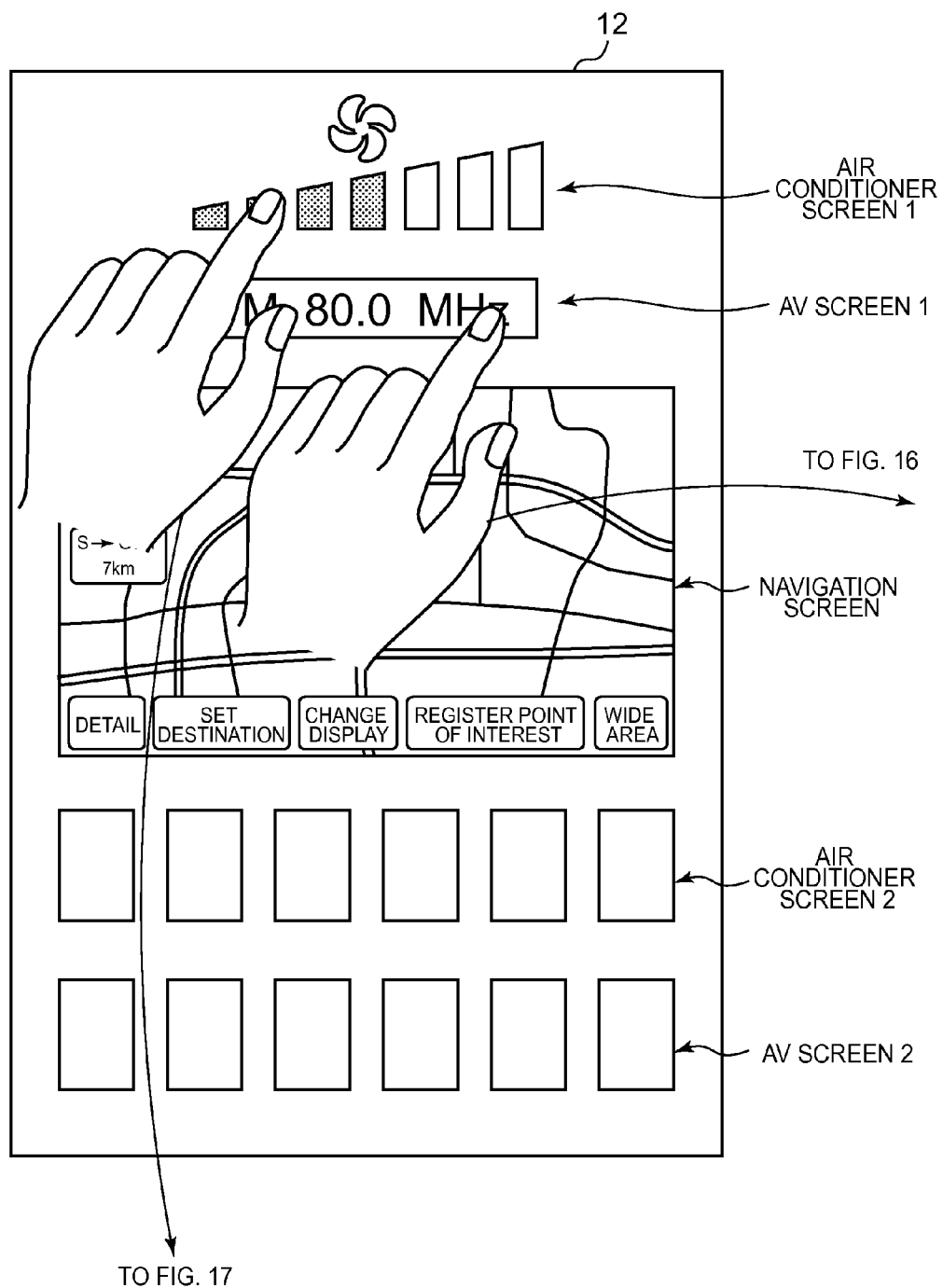
FIG. 15 is a diagram showing an example of a normal layout (second embodiment).
Figure 16:
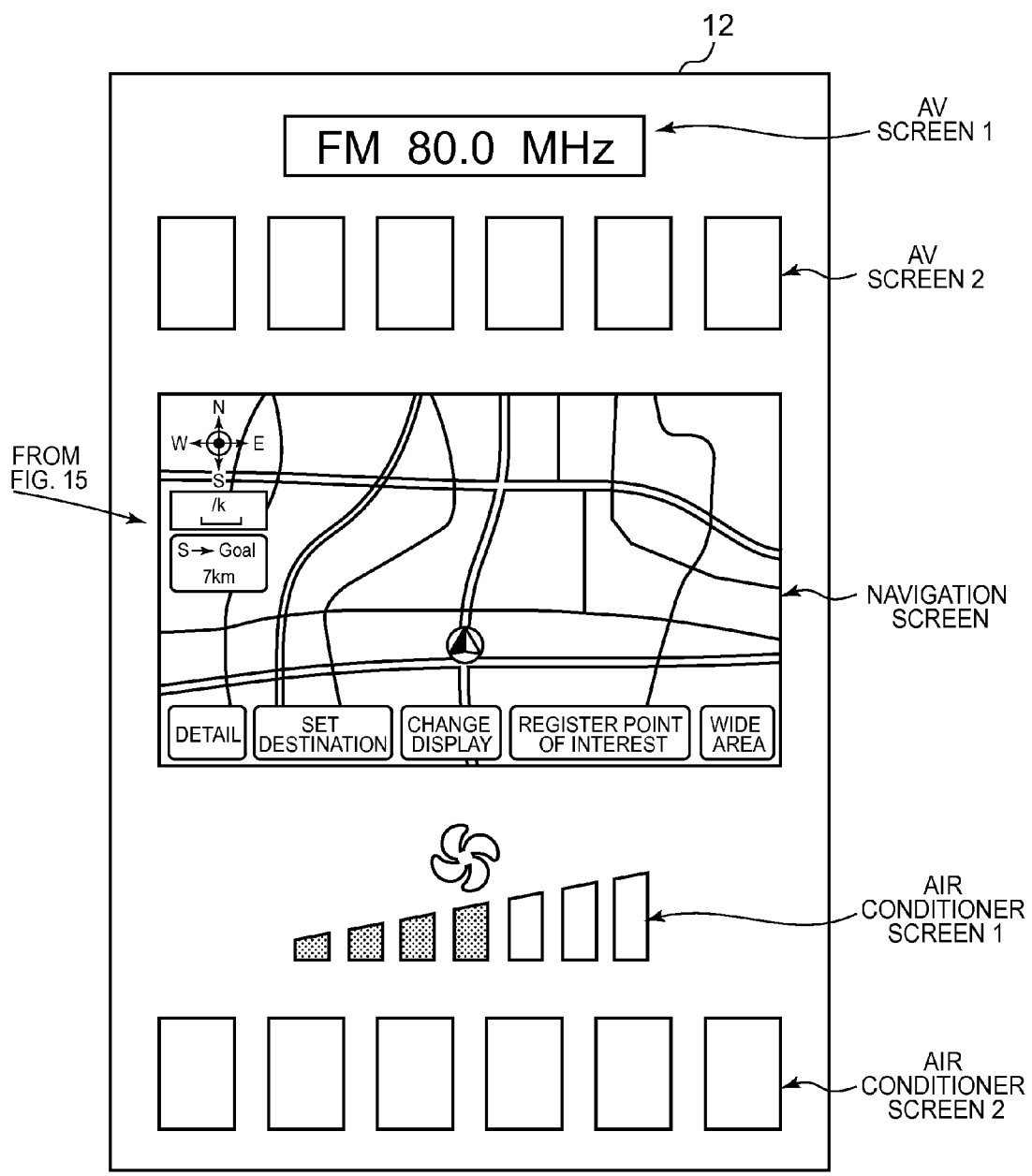
FIG. 16 is a diagram showing an example of an operation layout.
Figure 17:
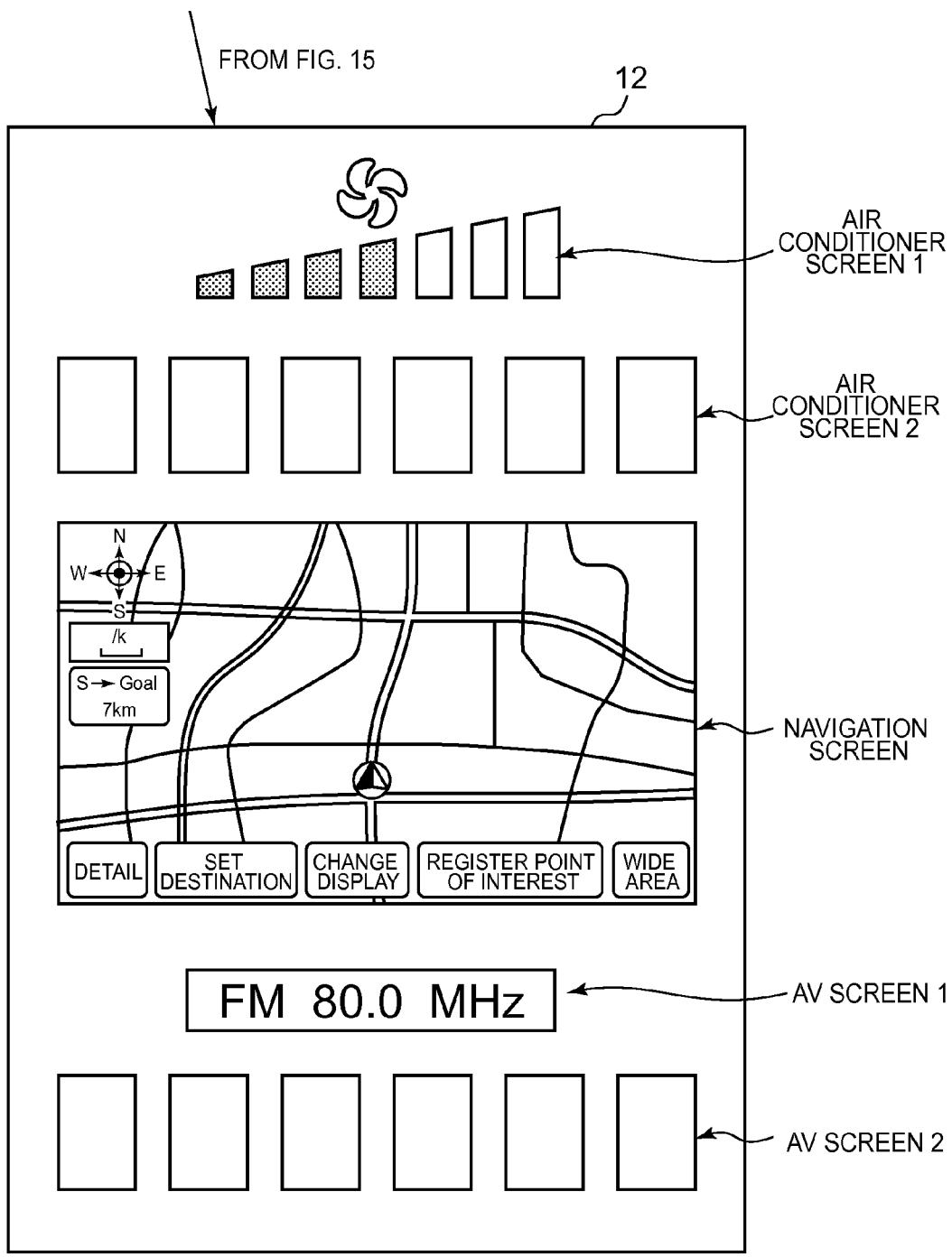
FIG. 17 is a diagram showing an example of an operation layout.

FIG. 15 shows an example of the normal layout, and FIGS. 16 and 17 show examples of the operation layout, respectively. FIGS. 15-17 show newly added screens, AV screens 1 and 2. The AV screen 1 is a content for displaying the selection state, and the AV screen 2 is a content for a soft key used to operate the source, channel selection, and volume of the AV device 15.

According to 4-(i), when the driver touches the air conditioner screen 1, the display device 100 displays the air conditioner screen 2, which is linked to the touched screen, in a high visibility position. When the driver touches the AV screen 1, the display device 100 displays the AV screen 2, which is linked to the touched screen, in a high visibility position. Therefore, when the driver touches the AV screen 1 in FIG. 15, the contents are displayed in the operation layout shown in FIG. 16. When the driver touches the air conditioner screen 1 in FIG. 15, the contents are displayed in the operation layout shown in FIG. 17.

FIG. 18 is an example of a diagram showing a display position table in which the display positions of contents in the operation layout are registered. The display position table is registered in the tables 40. In FIG. 18, the display order in the operation layouts 1 to 3 is registered in association with the display contents and a "touch determination target". Therefore, the content layout unit 33 selects one of the operation layouts 1 to 3 according to the content the driver has touched.

The operation layout 1 shows the operation layout when the air conditioner screen 1 is operated, and the operation layout 2 shows the operation layout when the AV screen 1 is operated. The operation layout 1 corresponds to FIG. 17, and the operation layout 2 corresponds to FIG. 16. In the operation layout 1, the air conditioner screen 1 corresponds to the "touch determination target", and the air conditioner screen 2 to the "link target".

The display position table in FIG. 18 may be used regardless of whether the driver has specified that no specific operation is performed in the normal layout or not. If the driver has specified that no specific operation is performed in the normal layout, the operation layout for use when the air conditioner screen 2 is operated may be registered. In this case, the air conditioner screen 2 may have the first priority or the air conditioner screen 1 may have the first priority.

The operation layout 3 indicates the operation layout for use "when the driver touches a non-content part" described in 4-(ii). The operation layout 3 is the same as the operation layout 1 because the driver has specified that the air conditioner screens 1 and 2 be displayed in a high visibility position or because the operation layout 1 was displayed last. The display device 100 may be designed such that the driver can register the layout of the contents as the operation layout 3 in advance. When the display contents are not those shown in the figure, several operation layouts are registered similarly.

Therefore, in addition to the effect of the first embodiment, this embodiment allows the priorities of the contents, displayed for the driver to operate, to be changed flexibly even when a plurality of soft keys is displayed.

Third Embodiment

The same display contents are displayed in the normal layout and in the operation layout in the first and second embodiments. This embodiment describes a display device 100 that displays a content, not displayed in the normal layout, in the operation layout.

Figure 19:
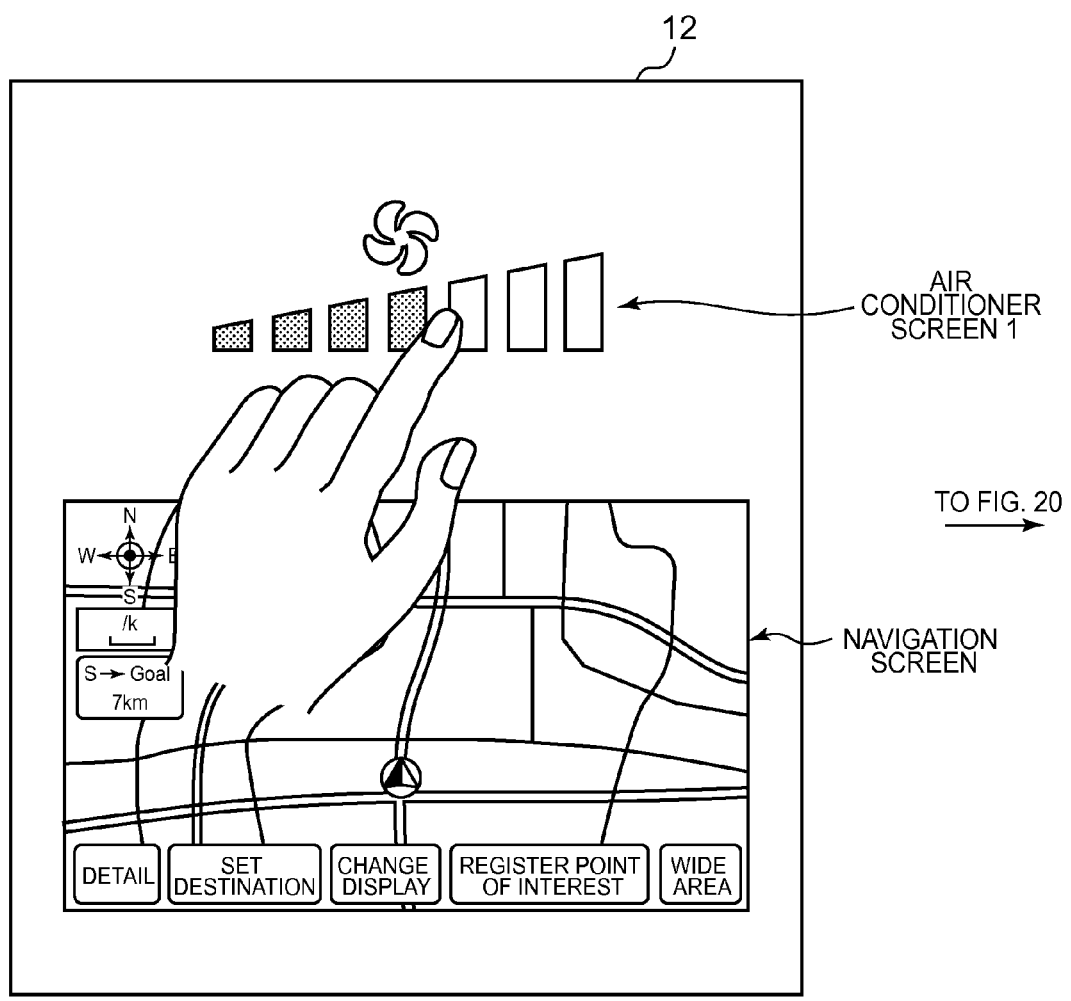
FIG. 19 is a diagram showing an example of a normal layout (third embodiment).
Figure 20:
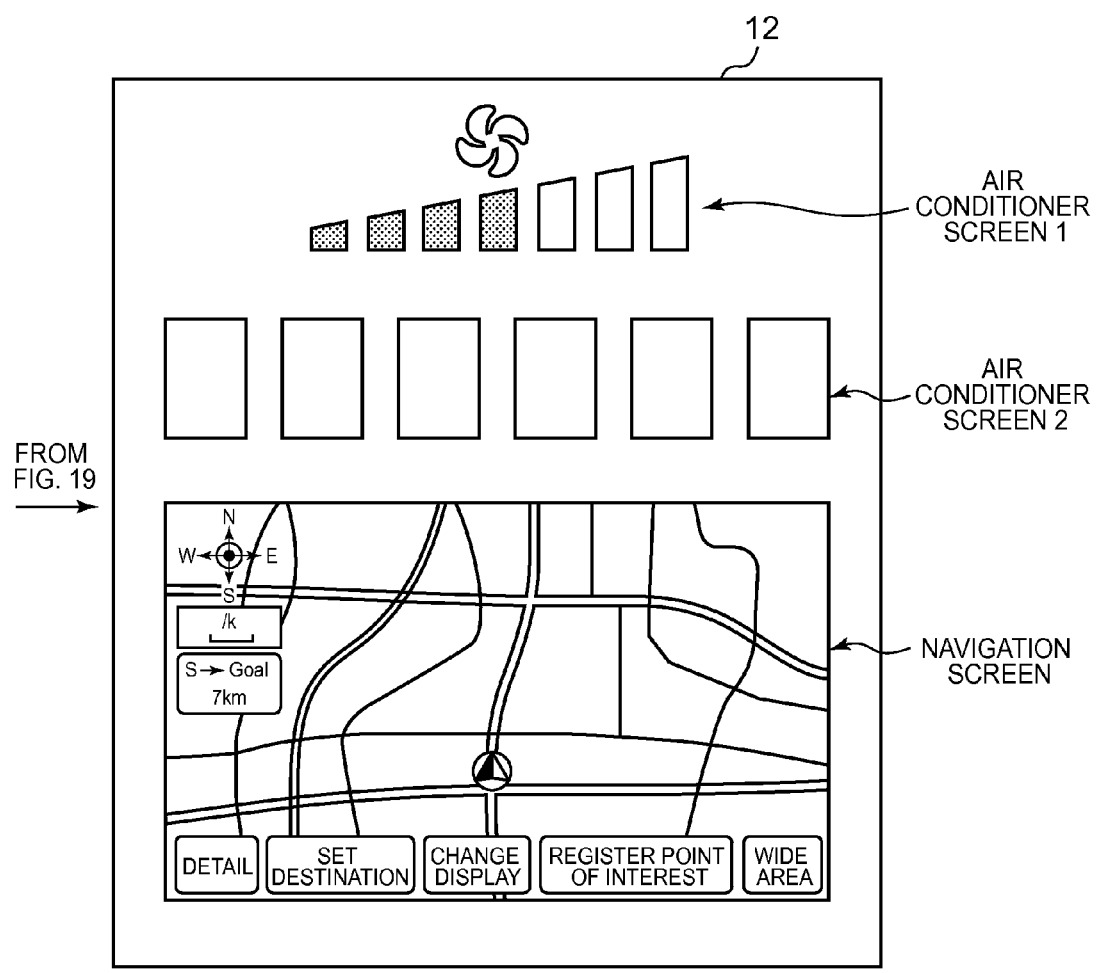
FIG. 20 is a diagram showing an example of an operation layout.

FIGS. 19 and 20 are diagrams showing examples of the normal layout and the operation layout in this embodiment. FIG. 19 is a diagram showing the normal layout in which only the air conditioner screen 1 and the navigation screen are displayed. When the driver selects the air conditioner screen 1 in this normal layout, the contents are displayed in the operation layout shown in FIG. 20. In this operation layout, the air conditioner screen 1, air conditioner screen 2, and navigation screen are displayed in this order. That is, the air conditioner screen 2, not displayed in the normal layout, is displayed in a high visibility position in the operation layout. This display method prevents a reduction in operability in the normal layout caused by too many contents and, when the driver operates a soft key, allows the soft key to be displayed in a high visibility position.

When the non-operation time elapses after the driver operates the air conditioner screen 2, the operation layout returns to the normal layout. In this case, the display may be changed such that, when the non-operation time T1 elapses, the transient operation layout is displayed in which the air conditioner screen 2 is displayed at the bottom and, when another non-operation time T2 elapses, the layout returns to the normal layout shown in FIG. 19 in which the air conditioner screen 2 is erased.

Figure 21:
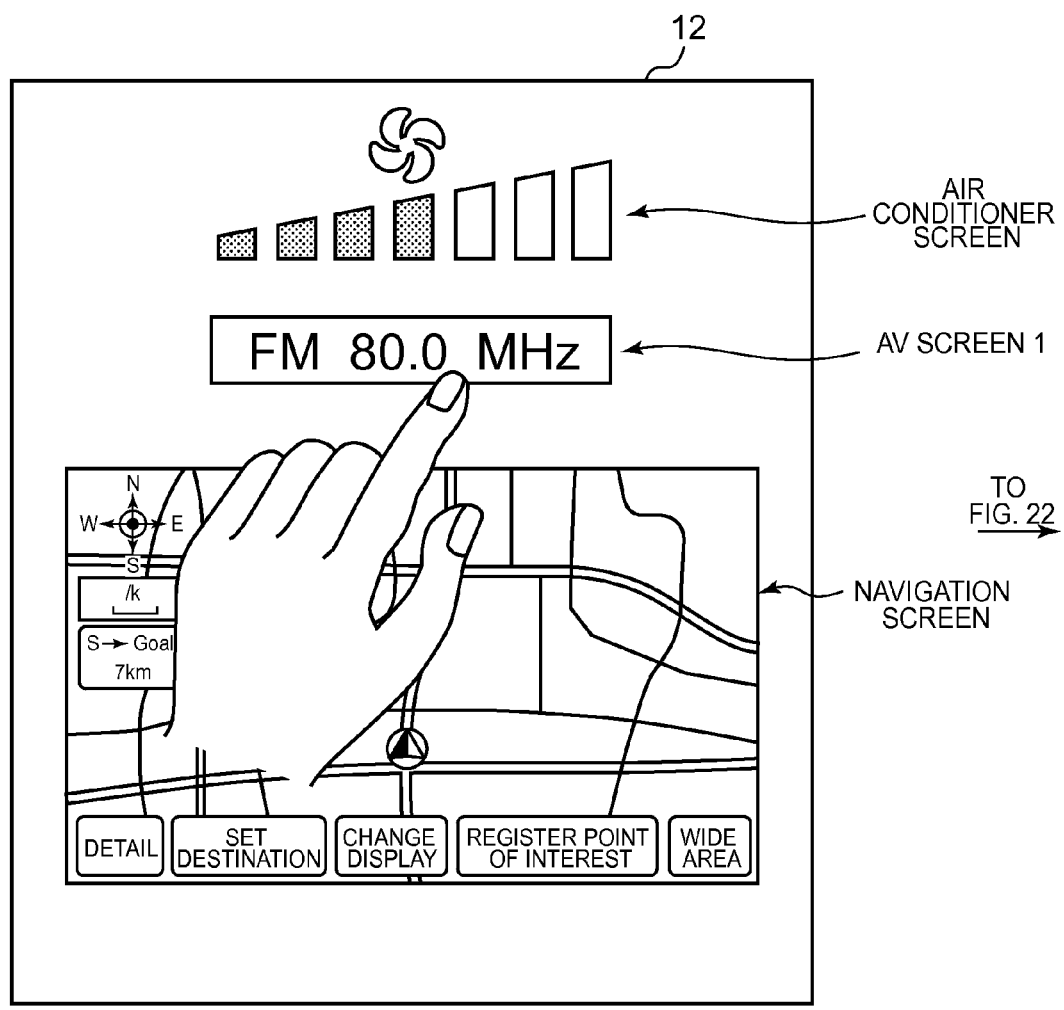
FIG. 21 is a diagram showing an example of a normal layout.
Figure 22:
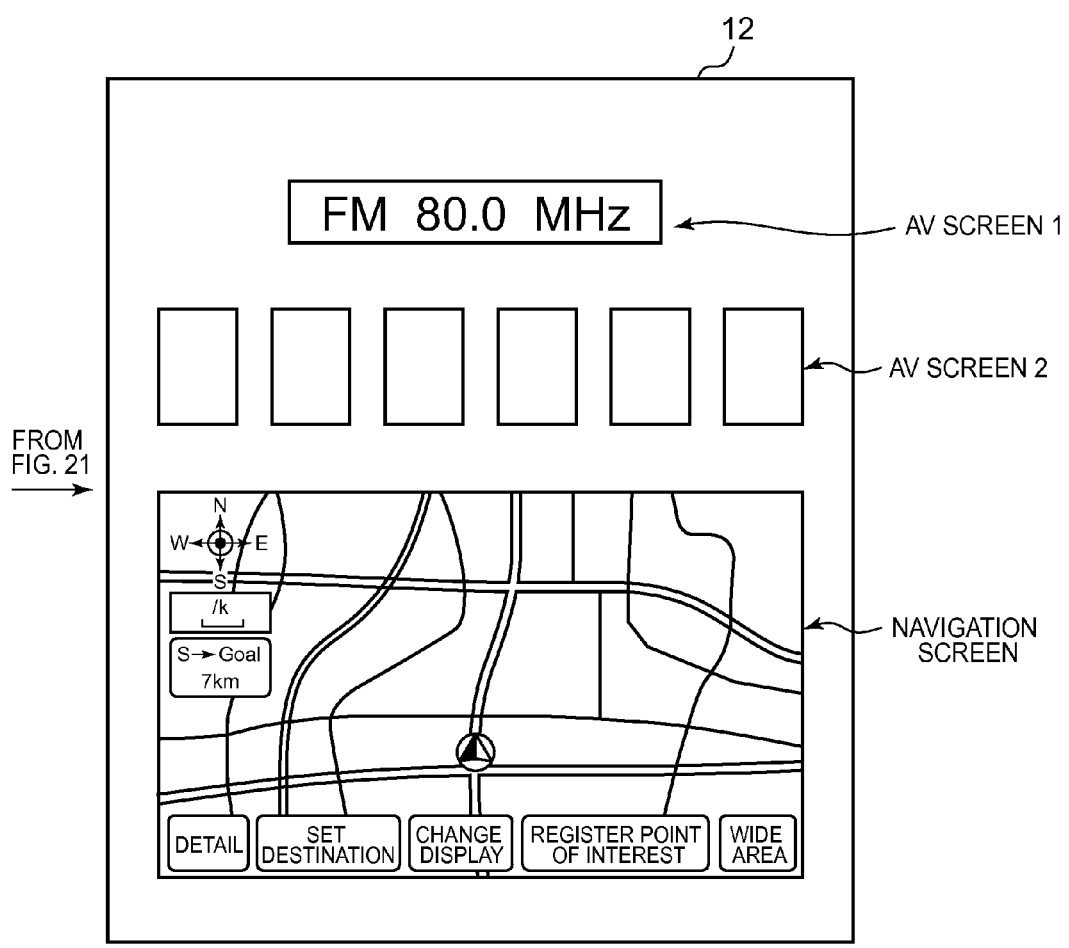
FIG. 22 is a diagram showing an example of an operation layout.
Figure 25:
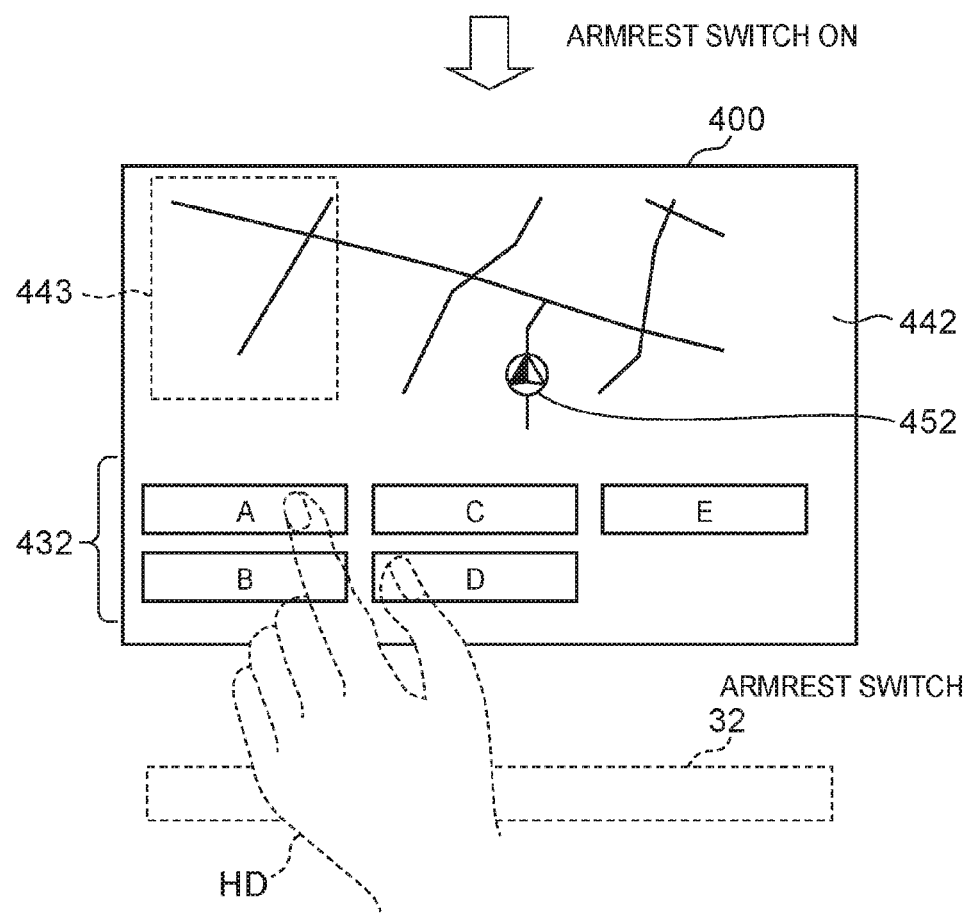
FIG. 25 is a screen transition diagram shown in Patent Literature 1.
Figure 26:
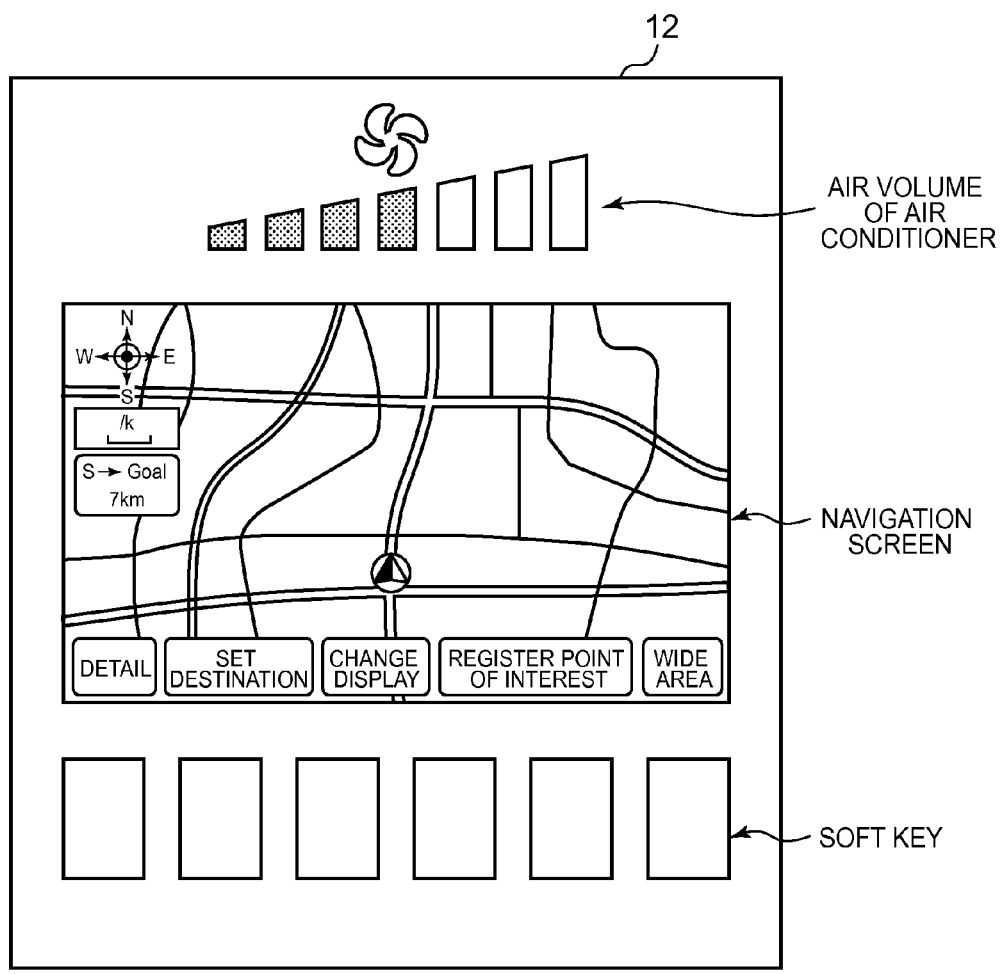
FIG. 26 is an example of a diagram showing that the optimum layout of contents varies according to the situation.
Figure 27:
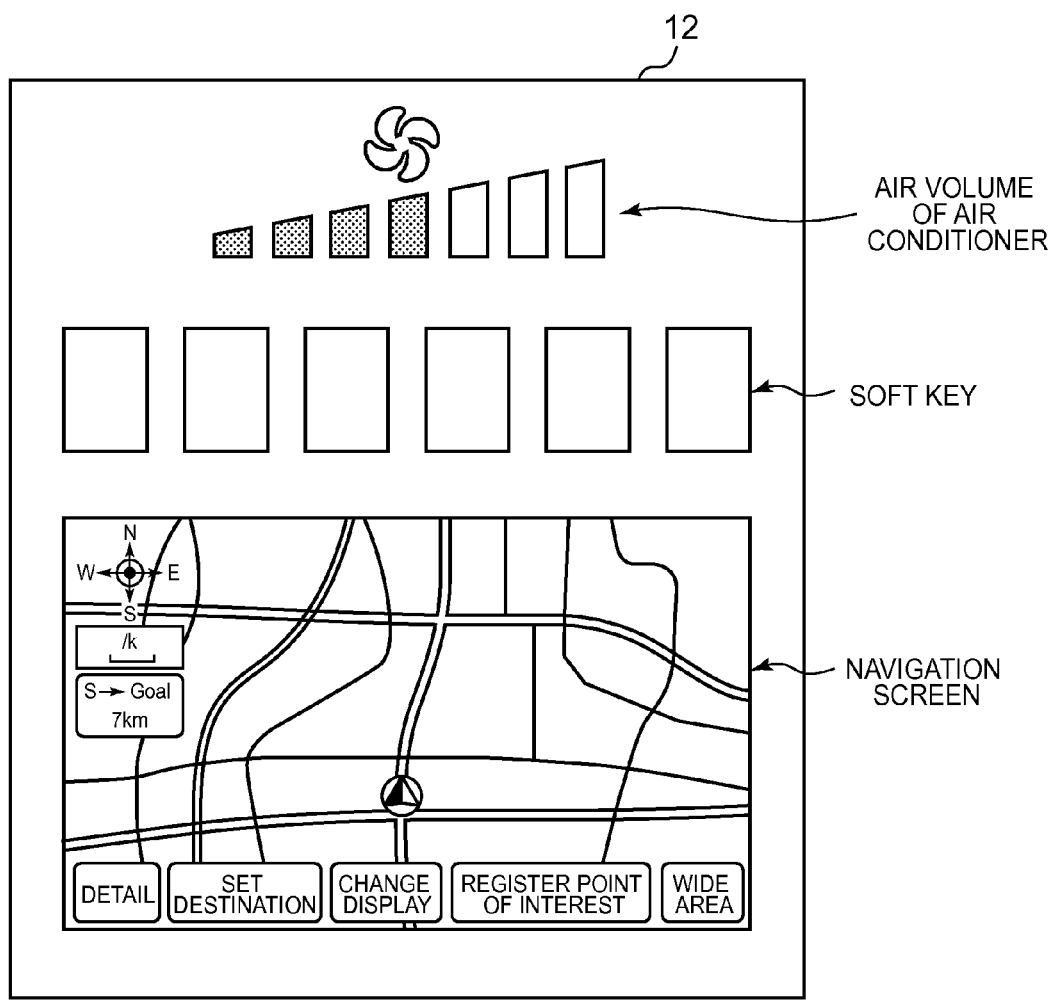
FIG. 27 is an example of a diagram showing that the optimum layout of contents varies according to the situation.

FIGS. 21 and 22 are diagrams showing other examples of the normal layout and the operation layout. FIG. 21 is a diagram showing the normal layout in which the air conditioner screen 1, AV screen 1, and navigation screen are displayed. When the driver selects the AV screen 1 in this normal layout, the contents are displayed in the operation layout shown in FIG. 22. In this operation layout, the AV screen 1, AV screen 2, and navigation screen are displayed in this order. That is, the AV screen 2, not displayed in the normal layout, is displayed in a high visibility position in the operation layout. In addition, the air conditioner screen 1 is erased in this operation layout. This method can temporarily decrease the number of display contents and, even when the display area of the display 12 is limited, display the soft key the driver will operate in a high visibility position. After the driver operates the AV screen 2, the operation layout returns to the normal layout.

The switching between the normal layout and the operation layout shown in FIGS. 19-22 can be implemented if a display content in the normal layout is associated with one or more display contents in the operation layout and their display order.

FIG. 23 is a diagram showing an example of a display position table in which the display contents in the normal layout, display contents in the operation layout, and display order are associated. The display position table is registered in the tables 40. In this embodiment, the types of display contents are different between the normal layout and the operation layout. In FIG. 23, a plurality of operation layouts is prepared for the display contents in one normal layout as in the second embodiment.

The operation layout 3, prepared for use when the driver touches the AV screen 1 in the normal layout at the bottom of FIG. 23 (1. Air conditioner screen 1, 2. AV screen 1, 3. Navigation screen), corresponds to "1. AV screen 1, 2. AV screen 2, 3. Navigation screen" in FIGS. 21 and 22.

The operation layout 2, prepared for use when the driver touches the navigation screen (a position not included in a soft key) in the normal layout at the bottom of FIG. 23, is an example in which there is no change in the display contents except that the navigation screen is arranged at the top.

In addition to the effect of the first and second embodiments, the display device 100 in this embodiment can display a content, not displayed in the normal layout, in the operation layout as described above, thus decreasing the number of contents in the normal layout. In addition, a content displayed in the normal layout may be erased in the operation layout. Therefore, the display device 100 can limit the number of contents and increase operability.

While the display device, which switches the layout from the normal layout to the operation layout where the priority of contents is considered, has been described above using embodiments, the present invention is not limited to the embodiments above but various modifications and improvements may be made in the scope of the present invention.

This international application claims priority based on Japanese Patent Application Publication No. 2012-092348 filed on Apr. 13, 2012, the contents of Japanese Patent Application Publication No. 2012-092348 is hereby incorporated in its entirety into the international application by reference.

The invention claimed is:

1. A display device for displaying content including a soft key on a display integrated with a touch panel, the display device comprising:
   a position detection portion that detects a position indicated on the display; and
   a content layout determination portion that determines a layout of a plurality of contents displayed on the display wherein
   when the position detection portion detects that a predetermined position on the display is indicated or a display position of a predetermined content is indicated, the content layout determination portion moves at least one of the contents, based on a priority of the contents predetermined according to a combination of the contents displayed on the display, and displays the soft key at a position where a line of sight movement amount is smaller than a line of sight movement amount at a position to which the moved content is moved, wherein the line of sight movement amount is an amount of movement of a driver's line of sight at a time when the driver moves the line of sight from a front of the vehicle to the position of the content or the position of the soft key on the display.

2. The display device according to claim 1 wherein, when a vertical length of the display is longer than a horizontal length, the content layout determination portion displays the soft key at a position higher than the position to which the moved content is moved and
   when the horizontal length of the display is longer than the vertical length, the content layout determination portion displays the soft key at a position on the display closer to a driver's seat than the position to which the moved content is moved.

3. The display device according to claim 1, further comprising:
   a content•soft-key association table that associates a content with the soft key wherein
   when the position detection portion detects that a display position of a first content is indicated, the first content being registered in the content•soft-key association table,
   the content layout determination portion moves a displayed second content according to the priority, and
   displays the soft key at a position where a line of sight movement amount is smaller than a line of sight movement amount of a position to which the moved second content is moved, the soft key being associated with the first content in the content•soft-key association table.

4. The display device according to claim 1 further comprising:
   a content table in which, for each content group in which a plurality of contents that can be displayed on the display at the same time is registered, the priority of each content is registered in association with a content displayed at a position detected by the position detection portion as an indicated position wherein
   the content layout determination portion identifies the priority of each content in the content table based on a first content displayed at a position detected by the position detection portion as an indicated position, moves a displayed second content according to the priority, and displays the soft key at a position where a line of sight movement amount is smaller than a line of sight movement amount of the second content, the soft key having a priority higher than the priority of the second content.

5. The display device according to claim 4 wherein
   for each of the content group in which a content not displayed on the display is included, the priority of each content is registered in the content table in association with a content displayed at a position detected by the position detection portion as an indicated position.

6. The display device according to claim 5 wherein
   the content layout determination portion displays a content, not displayed before the position detection portion detects that a content is indicated, after the position detection portion detects that the content is indicated, or
   erases a content, displayed before the position detection portion detects that a content is indicated, after the position detection portion detects that the content is indicated.

7. The display device according to claim 1, further comprising:
   an object detection portion that detects an object, which approaches the display, before the object touches the display wherein
   when the object detection portion detects the object, the content layout determination portion moves at least one of displayed contents and displays the soft key at a position where a line of sight movement amount is smaller than a line of sight movement amount of the moved content.

8. The display device according to claim 1 further comprising:
   a touch pad for detecting an occupant's fingertip position that moves in synchronization with a position of a cursor on the display wherein
   the position detection portion detects a position at which the cursor is present when the touch pad is pressed.

* * * * *